US008848012B2

(12) United States Patent  
Nagumo

(10) Patent No.: US 8,848,012 B2  
(45) Date of Patent: Sep. 30, 2014

(54) DRIVE DEVICE, PRINT HEAD AND IMAGE FORMING APPARATUS

(75) Inventor: Akira Nagumo, Tokyo (JP)

(73) Assignee: Oki Data Corporation, Tokyo (JP)

( * ) Notice: Subject to any disclaimer, the term of this patent is extended or adjusted under 35 U.S.C. 154(b) by 240 days.

(21) Appl. No.: 13/069,792

(22) Filed: Mar. 23, 2011

(65) Prior Publication Data

US 2011/0234742 A1 Sep. 29, 2011

(30) Foreign Application Priority Data

Mar. 23, 2010 (JP) ................................ 2010-066292

(51) Int. Cl.
| | |
|---|---|
| B41J 2/385 | (2006.01) |
| B41J 2/39 | (2006.01) |
| B41J 2/395 | (2006.01) |
| B41J 2/435 | (2006.01) |
| B41J 2/47 | (2006.01) |
| B41J 2/45 | (2006.01) |
| G06K 15/12 | (2006.01) |

(52) U.S. Cl.
CPC ............ *B41J 2/435* (2013.01); *G06K 15/1238* (2013.01)
USPC ........... 347/237; 347/130; 347/132; 347/141; 347/238; 347/247

(58) Field of Classification Search
USPC ................... 347/130, 132, 141, 237, 238, 247
See application file for complete search history.

(56) References Cited

U.S. PATENT DOCUMENTS

| | | | | |
|---|---|---|---|---|
| 5,686,752 A | * | 11/1997 | Ishimura et al. | ............... 257/369 |
| 2009/0295901 A1 | * | 12/2009 | Nagumo | ....................... 347/130 |

FOREIGN PATENT DOCUMENTS

| | | |
|---|---|---|
| JP | 11-68545 A | 3/1999 |
| JP | 2001-287393 A | 10/2001 |
| JP | 2009-289836 A | 12/2009 |

* cited by examiner

*Primary Examiner* — Justin Seo  
*Assistant Examiner* — Kendrick Liu  
(74) *Attorney, Agent, or Firm* — Marvin A. Motsenbocker; Mots Law, PLLC

(57) ABSTRACT

A drive device to drive a plurality of three-terminal light emitting elements, comprising: a drive circuit including a first MOS transistor and configured to drive conducting three-terminal light emitting elements among a plurality of three-terminal light emitting elements based on a received drive signal. The first MOS transistor includes: a third terminal connected to a second power supply having a potential different from a potential of the first power supply; a fourth terminal connected to the second terminals connected in common, a second control terminal configured to control a conduction state between the third terminal and the fourth terminal based on the drive signal; and a substrate terminal set to have a potential different from the potential of the second power supply in a direction of increasing threshold voltage of the first MOS transistor.

18 Claims, 14 Drawing Sheets

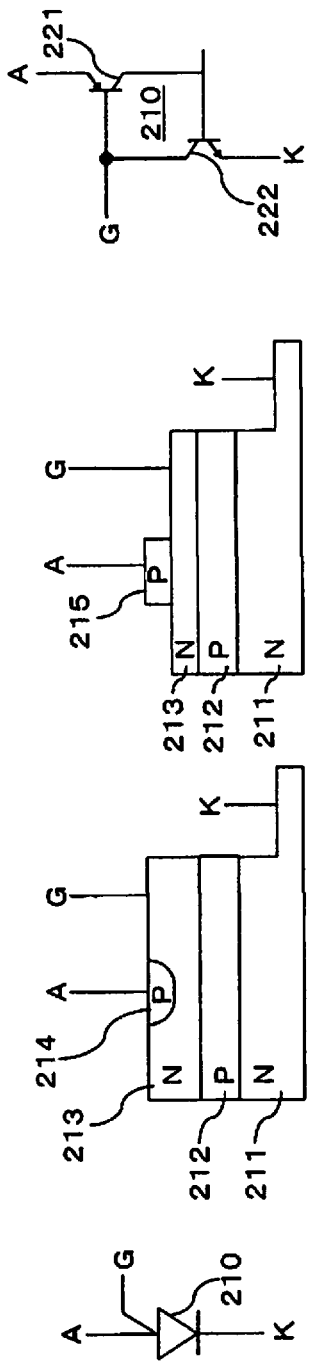

DRIVE DEVICE, PRINT HEAD AND IMAGE FORMING APPARATUS

CROSS REFERENCE TO RELATED APPLICATIONS

This application claims priority based on 35 USC 119 from prior Japanese Patent Application No. 2010-066292 filed on Mar. 23, 2010, entitled "DRIVE DEVICE, PRINT HEAD AND IMAGE FORMING APPARATUS", the entire contents of which are incorporated herein by reference.

BACKGROUND OF THE INVENTION

1. Field of the Invention

The invention relates to a drive device which selectively and cyclically drives a group of three-terminal light emitting elements such as light emitting thyristors, a print head including the drive device, and an image forming apparatus such as an electrophotographic printer including the print head.

2. Description of Related Art

Conventionally, as a drive device provided in an image forming apparatus such as an electrophotographic printer, the following configuration has been known for driving a light emitting thyristor array in which a large number of light emitting thyristors are arranged. The configuration includes a complementary MOS (hereinafter, referred to as "CMOS") inverter having a CMOS transistor and includes a current limiting resistor. In this configuration, the CMOS inverter supplies drive current to the anode of the light emitting thyristor array via the current limiting resistor (for example, Japanese patent application publication No. 2001-287393). The current limiting resistor and the anode of the light emitting thyristor array are connected with each other through, for example, a connecting cable.

SUMMARY OF THE INVENTION

Conventional drive devices, print heads and image forming apparatuses, however, have a problem that the drive current oscillates in a negative resistance region of the light emitting thyristors since the resistance value of the current limiting resistor in the drive device is lower than the absolute value of the negative resistance of the light emitting thyristor. In addition, the oscillation phenomenon occurs at the rising and falling portions of the drive current, whereby the substantial drive pulse width of the drive current fluctuates and causes the exposure energy to change.

Also, when the current limiting resistor and the anode of the light emitting thyristor array are electrically connected with each other via a long cable, signal reflection occurs multiple times between the drive device and the light emitting thyristor array, and this increases the rising and falling times of the drive current waveform. This also produces a problem of preventing high-speed switching control of the light emitting thyristor array.

A first aspect of the invention is a drive device configured to drive a plurality of three-terminal light emitting elements each including: a first terminal connected to a first power supply; a second terminal configured to enable drive current flow to the first terminal from the second terminal, and a first control terminal configured to control a conduction state between the first terminal and the second terminal, the first terminals being connected in common and the second terminals being connected in common. The drive device includes: a drive circuit including a first MOS transistor and configured to drive conducting three-terminal light emitting elements among the plurality of three-terminal light emitting elements based on a received drive signal. The first MOS transistor includes: a third terminal connected to a second power supply having a potential different from the potential of the first power supply; a fourth terminal connected to the second terminals connected in common, a second control terminal configured to control a conduction state between the third terminal and the fourth terminal based on the drive signal; and a substrate terminal set to have a potential different from the potential of the second power supply in the direction of increasing threshold voltage of the first MOS transistor.

In the first aspect, the fourth terminal and the second terminals connected in common may be connected with each other via a connection cable having a predetermined characteristic impedance, and a terminating circuit having a termination resistance connected to the second terminals connected in common may be disposed at an end portion of the area where the plurality of three-terminal light emitting elements are arrayed.

In the first aspect, the three-terminal light emitting element may be a light emitting thyristor, and an equivalent resistance value of the drive circuit may be set to a value higher than an absolute value of negative resistance determined by the turn-on characteristic of the light emitting thyristor.

A second aspect of the invention is a print head including the plurality of the three-terminal light emitting elements and the drive device of the first aspect.

A third aspect of the invention is an image forming apparatus including the print head of the second aspect, wherein the print head emits light to form an image on a recording medium.

In the drive device according to the first aspect and the print head according to the second aspect, the first MOS transistor in the drive circuit is provided with substrate bias effects to increase its threshold voltage, and thereby operates in a saturation region to achieve constant current driving. For this reason, the output resistance of the drive circuit can be increased beyond the negative resistance of the three-terminal light emitting element (for example light emitting thyristor), which in turn prevents oscillation phenomenon due to the negative resistance.

For example, the terminating circuit solves a problem that rising and falling times of the drive current waveform increase due to multiple signal reflections occurring between the drive circuit and the plurality of three-terminal light emitting elements, even when a long cable is used to connect the drive circuit with the three-terminal light emitting elements (for example, light emitting thyristors). Thus, the terminating circuit enables high-speed switching control of the three-terminal light emitting elements.

According to the third aspect, the image forming apparatus is provided with the print head of the first aspect. Thus, the image forming apparatus prevents variations of exposure energy and thereby achieves high-quality image formation without non-uniform print density.

BRIEF DESCRIPTION OF THE DRAWINGS

FIGS. 6A to 6D are diagrams illustrating a configuration of light emitting thyristor 210 shown in FIG. 1.

DETAILED DESCRIPTION OF THE EMBODIMENTS

Figure 1:
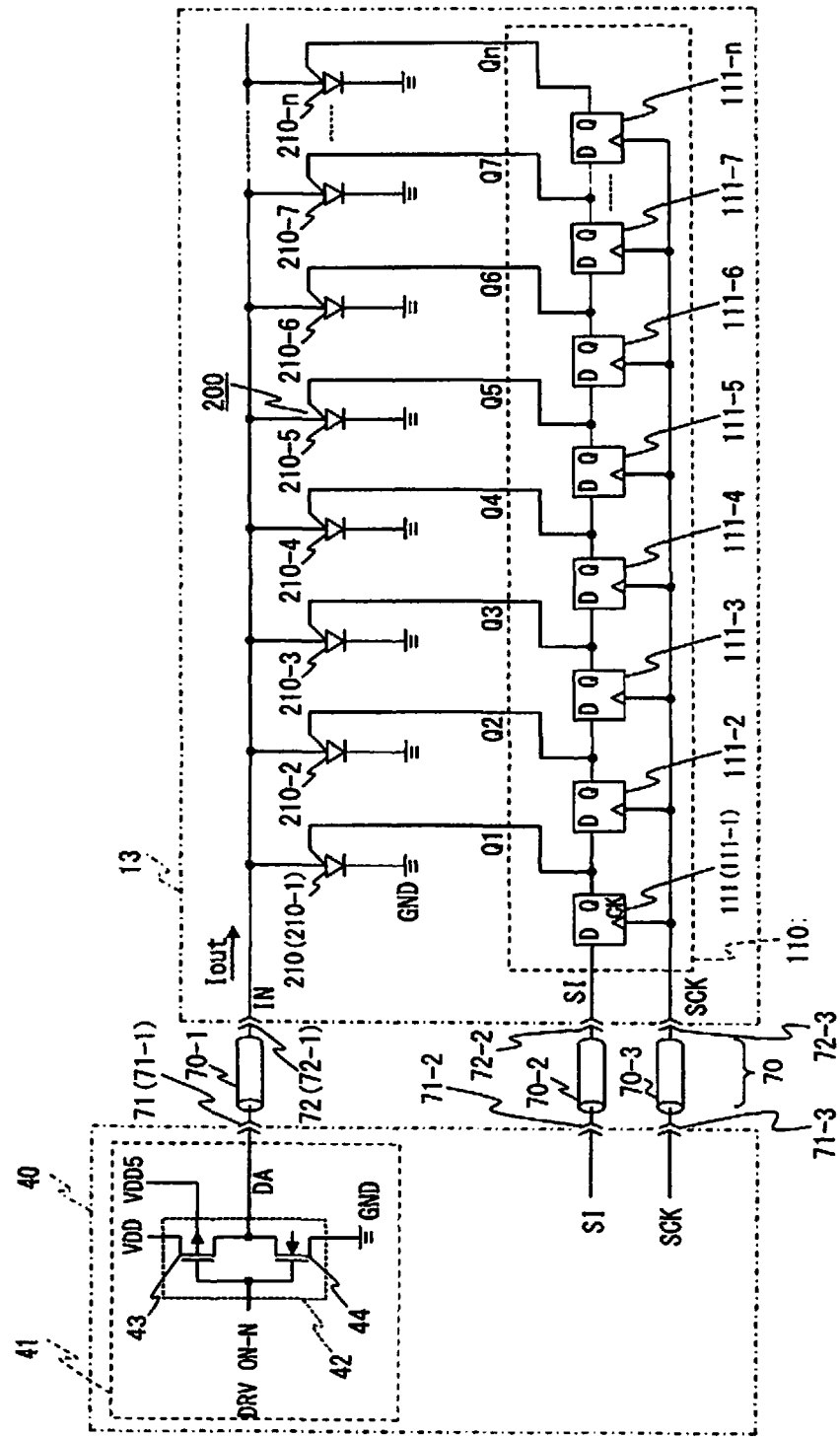
FIG. 1 is a block diagram illustrating a circuit configuration of a printing controller and a print head shown in FIG. 5 according to Embodiment 1 of the invention.

Descriptions are provided herein below for embodiments based on the drawings. In the respective drawings referenced herein, the same constituents are designated by the same reference numerals and duplicate explanation concerning the same constituents is omitted. All of the drawings are provided to illustrate the respective examples only.

Embodiment 1

(Image Forming Apparatus According to Embodiment 1)

Figure 2:
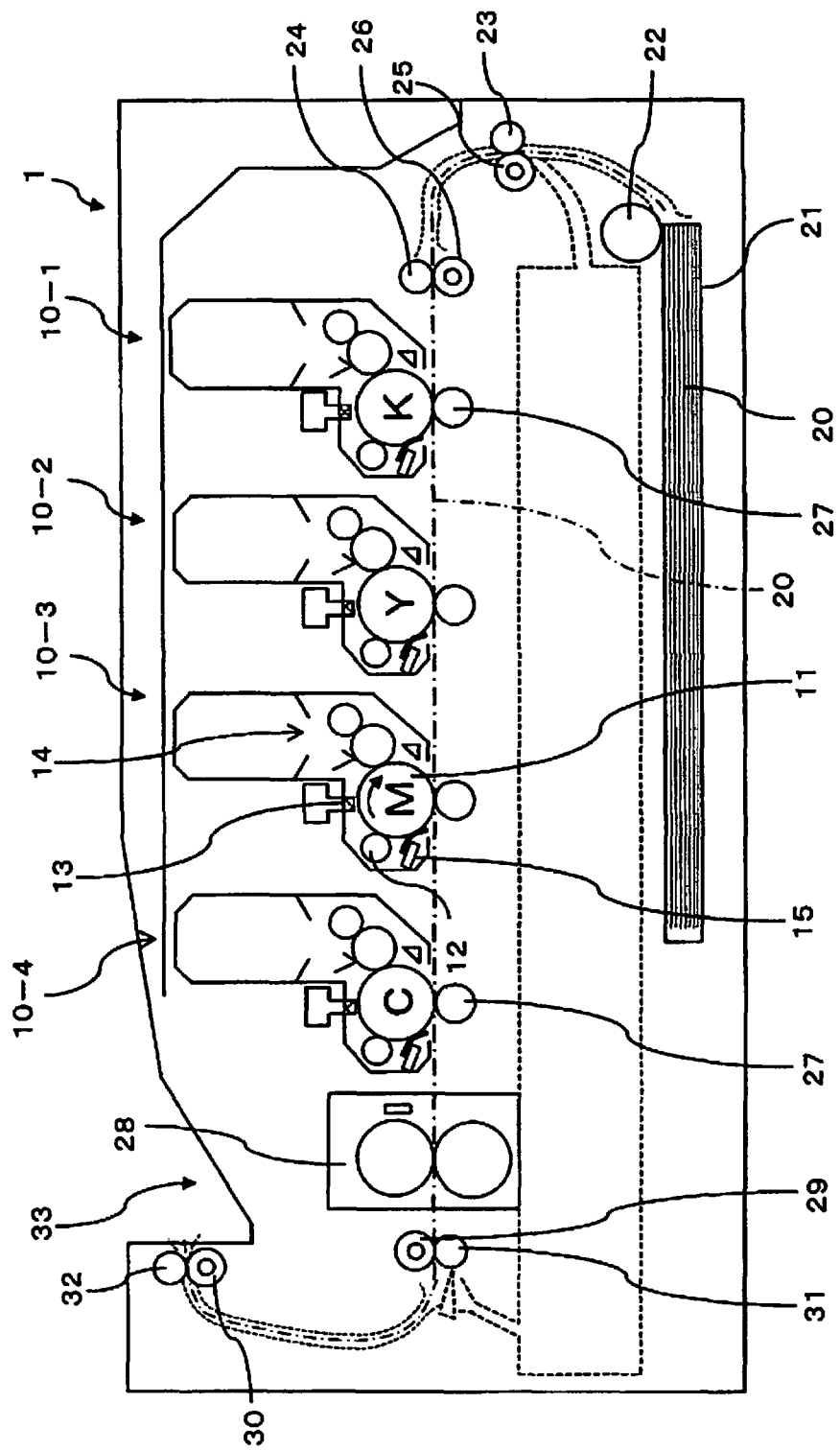
FIG. 2 is a schematic configuration diagram illustrating an image forming apparatus according to Embodiment 1 of the invention.

FIG. 2 is a schematic configuration diagram of an image forming apparatus according to Embodiment 1 of the invention.

Image forming apparatus 1 is a tandem type electrophotographic color printer provided with an exposure device (for example, a print head) including a light emitting element array as a three-terminal switch element array using driven elements (for example, light emitting thyristors each of which is a three-terminal switch element as a light emitting element). Image forming apparatus 1 includes four process units 10-1 to 10-4, which are disposed in that order from upstream of the transport path of recording medium 20 (for example, paper) so as to respectively form black (K), yellow (Y), magenta (M) and cyan (c) images. The common internal configuration of process units 10-1 to 10-4 is described by citing process unit 10-3 for magenta as an example.

Process unit 10-3 includes photosensitive body 11 (for example, photosensitive drum) as an image carrier which is rotatably disposed in the arrow direction shown in FIG. 2. Photosensitive drum 11 is surrounded by, in the order from upstream of the rotating direction thereof, electrification device 12 which charges photosensitive body 11 by supplying charge to the surface thereof and print head 13 as an exposure device forming an electrostatic latent image on the surface of charged photosensitive body 11 by selectively irradiating light thereto. Further, on the surface of photosensitive body 11 where the electrostatic latent image is formed, development unit 14 generates a visible image as a toner image (a developer image) by applying toner (developer) of the specified color (for example, magenta) and cleaning device 15 removes toner residing on photosensitive body 11 after transfer of the visible image to recording medium 20. Further, drums or rollers used in such devices rotate with power transmitted from drive sources (not shown) via gear or the like.

At the bottom of image forming apparatus 1, paper cassette 21 storing accumulated paper 20 is mounted, and feed roller 22 carrying paper 20 one by one is disposed thereupon. On the downstream side of feed roller 22 in the transport direction of paper 20, transport roller 25 carries paper 20 held by pinch rollers 23 and 24, and resist roller 26 carrying paper 20 to process unit 10-1 while correcting skew of paper 20 are disposed. Feed roller 22, transport roller 25 and resist roller 26 are rotated by power transmitted from a drive source (not shown) via gears or the like.

Transfer rollers 27, or a transfer unit, made of send-conductive material or the like are disposed opposite to photosensitive drums 11 of process units 10-1 to 10-4, respectively. Potential is applied to each of transfer rollers 27 so as to provide a potential difference between photosensitive drums 11 and transfer rollers 27 to transfer the visible toner images from photosensitive drums 11 onto paper 20.

Fixing unit 28 is disposed downstream of process unit 10-4. Fixing unit 28 is a device including a heating roller and a backup roller configured to fix toner transferred onto paper 20 by pressure and heat. Downstream of fixing unit 28 are provided discharge rollers 29 and 30 and pinch rollers 31 and 32 of the discharge portion and paper stacker 33. Discharge rollers 28 and 30 hold paper 20, discharged from fixing unit 28, in conjunction with pinch rollers 31 and 32 of the discharge portion and carry it to paper stacker 33. Fixing unit 28, discharge roller 29 and the like are rotated by power transmitted from a drive source (not shown) via gears or the like.

Image recording apparatus 1 thus configured operates as described below.

First, paper 20 stored in paper cassette 21 is sequentially fed from the top of the paper stack by feed roller 22. Then, paper 20 is transported between photosensitive body 11 of process unit 10-1 and transfer roller 27 while being held by carriage roller 25, resist roller 26 and pinch rollers 23 and 24. Thereafter, paper 20 is held by photosensitive body 11 and transfer roller 27, a toner image is transferred onto the surface thereof, and simultaneously, paper 20 is transported by rotation of photosensitive body 101. Similarly, paper 20 passes through process units 10-2 to 10-4 sequentially while toner images of respective colors of the electrostatic latent image formed by print heads 13 are developed by developers 14 and overlapped by their sequential transfer onto the recording surface thereof.

After toner images of respective colors are overlapped on the recording surface of the paper, paper 20 on which the toner images are fixed by fixing unit 28 is discharged to paper stacker 33 outside image forming apparatus 1 while being held by discharge rollers 29 and 30 and pinch rollers 31 and 32. A color image is formed on paper 20 through the process described above.

(Print Head According to Embodiment 1)

Figure 3:
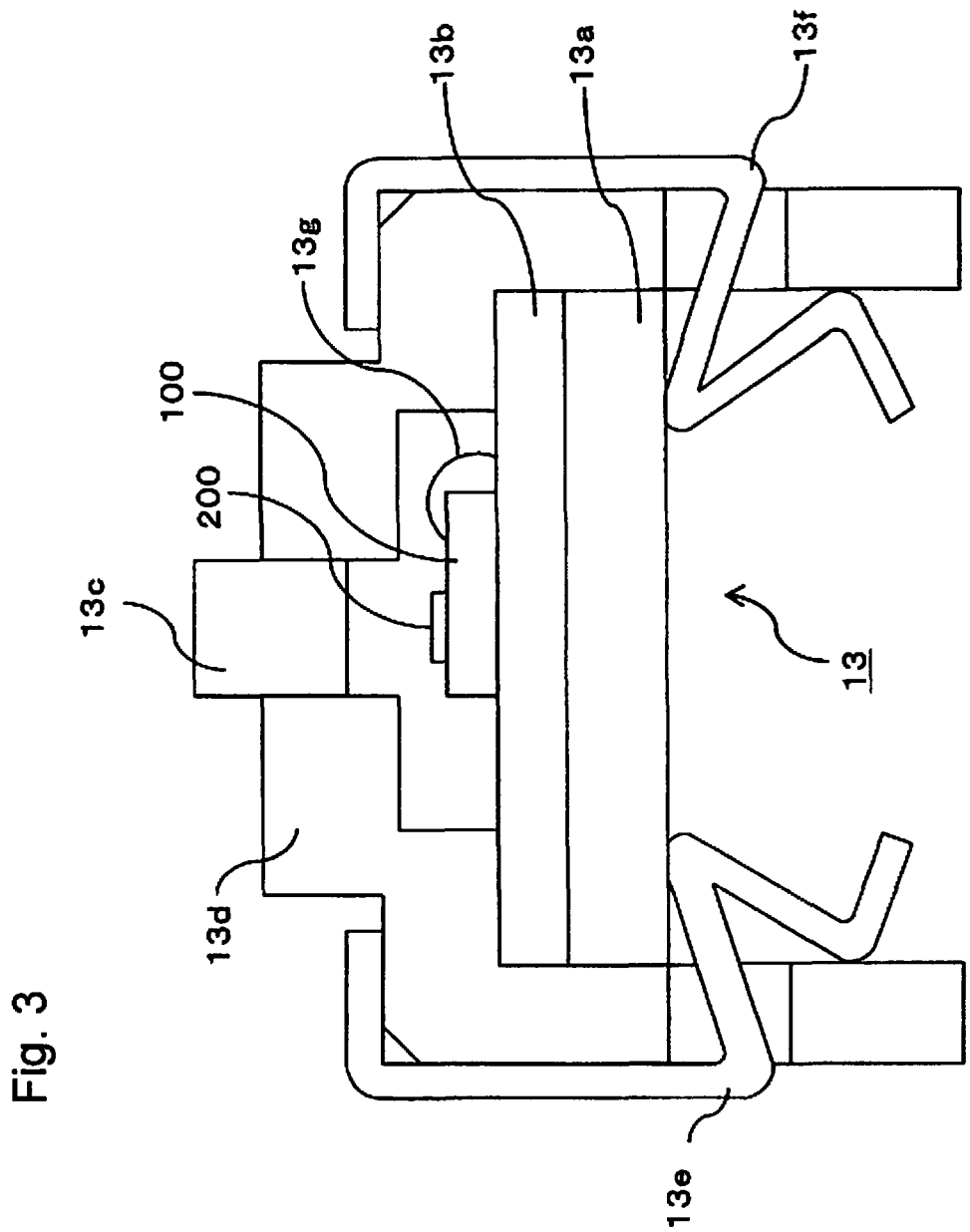
FIG. 3 is a schematic cross section illustrating a configuration of print head 13 shown in FIG. 2.
Figure 4:
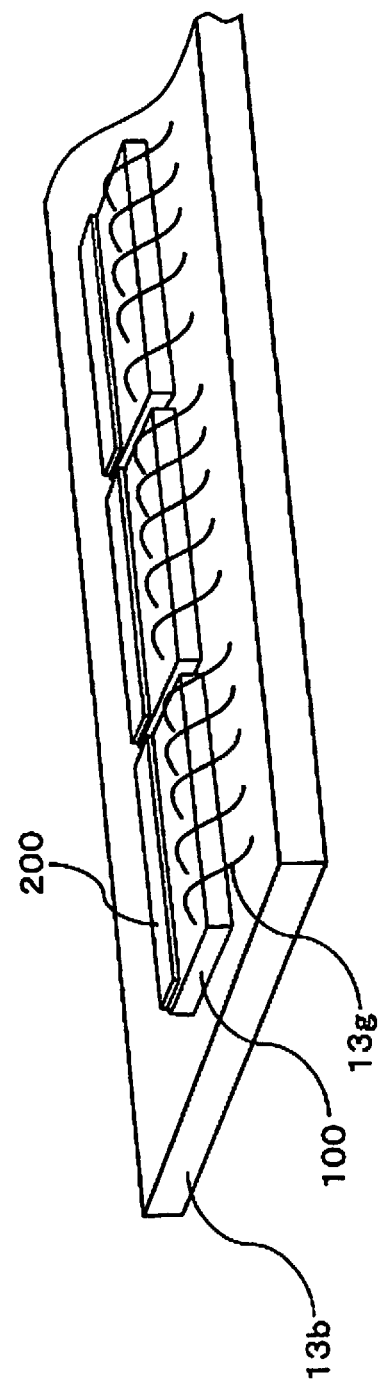
FIG. 4 is a perspective view of a substrate unit shown in FIG. 3.

FIG. 3 is a schematic cross section illustrating a configuration of print head 13 shown in FIG. 2. FIG. 4 is a perspective view of a substrate unit shown in FIG. 3.

Print head 13 shown in FIG. 3 includes base material 13a, on which a substrate unit shown in FIG. 4 is fixed. The substrate unit includes: print substrate 13b fixed on base material 13a with an adhesive or the like; a plurality of integrated circuits 100 (hereinafter, referred to as IC) on which shift registers are integrated; and light emitting element arrays 200 including a plurality of chip-shaped light emitting element strings (for example, light emitting thyristor strings) fixed on IC chips 100 with an adhesive or the like. Light emitting element arrays 200 and IC chips 100 are electrically connected to each other by means of thin film wires (not shown) or the like. Further, a plurality of terminals in IC chips 100 and wiring pads (not shown) on print substrate 13b are electrically connected with each other by means of bonding wires 13g.

On the plurality of light emitting element arrays 200, lens array (for example, rod lens array) 13c formed by multiple arrays of columnar optical elements is disposed, and rod lens array 13c is fixed with holders 13d. Base element 13a, print substrate 13b and holders 13d are fixed with clamp elements 13e and 13f.

(Printer Control Circuit According to Embodiment 1)

Figure 5:
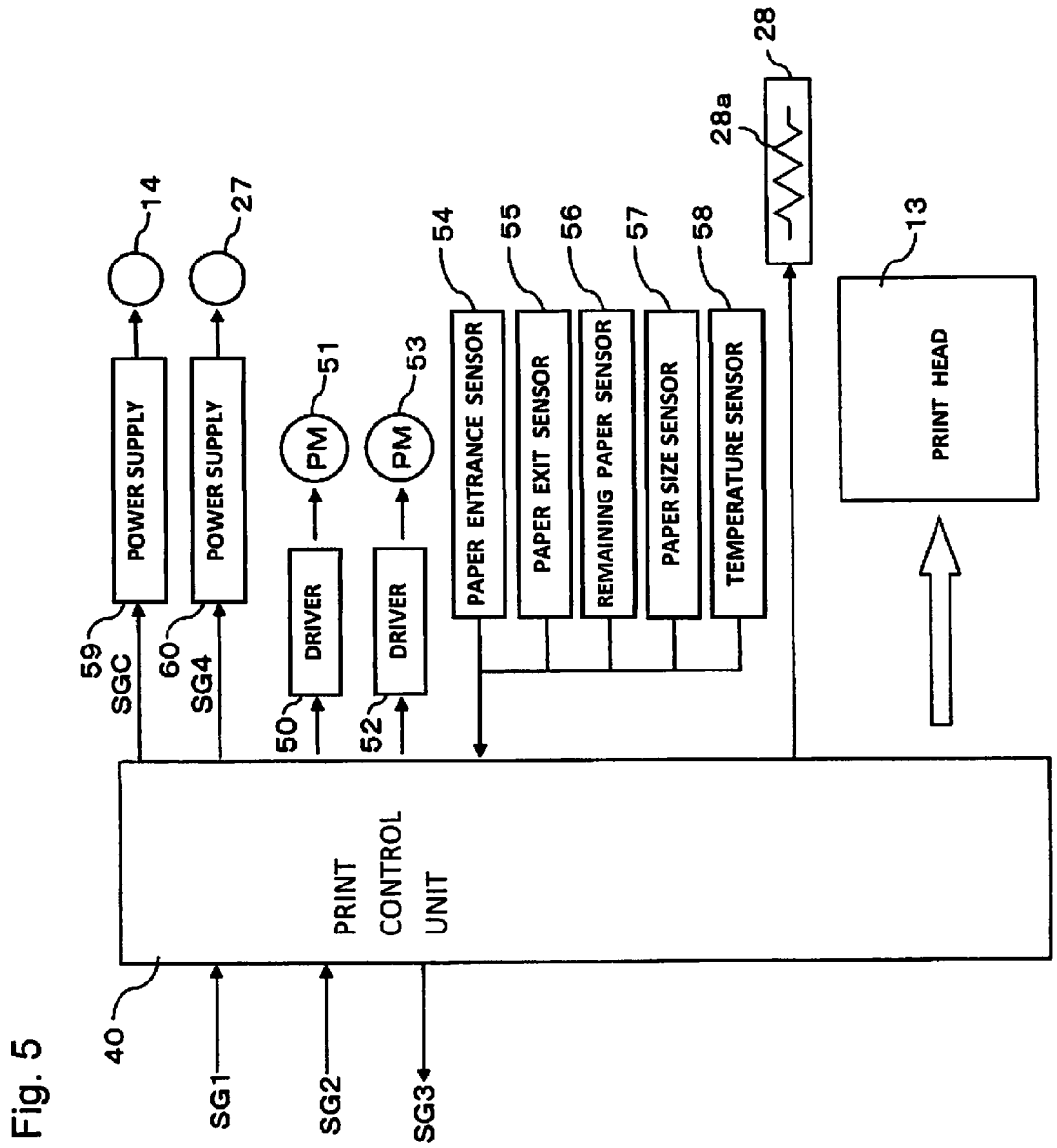
FIG. 5 is a block diagram illustrating a configuration of a printer control circuit in image forming apparatus 1 shown in FIG. 2.

FIG. 5 is a block diagram illustrating a configuration of a printer control circuit in image forming apparatus 1 shown in FIG. 2.

The printer control circuit includes printing controller 40 disposed inside a printing unit of image forming apparatus 1. Printing controller 40 includes a microprocessor, a read only memory (ROM), a random access memory (RAM), input and output ports for signal input and output, a timer, and the like, and is provided with a function to perform printing by executing sequential control over the printer as a whole with upper-level controller's control signal SGI (not shown), video signal SG2 (one-dimensionally arrayed dot map data) and the like. Connected to printing controller 40 are four print heads 13 of process units to 10-1 to 10-4, heater 28a of fixing unit 28, drivers 50 and 52, paper intake port sensor 54, paper discharge port sensor 55, residual paper quantity sensor 56, paper size sensor 57, fixing unit temperature sensor 58, charging high-voltage power supply 59, transfer high-voltage power supply 60, and the like. Development and transfer process motor (PM) 51 is connected to driver 50, paper feed motor (PM) 53 is connected to driver 52, developer 14 is connected to charging high-voltage power supply 59, and transfer roller 27 is connected to transfer high-voltage power supply 60.

The printer control circuit of such configuration operates as described below.

Upon receiving a printing command by control signal SG1 transmitted from an upper-level controller, printing controller 40 first detects with temperature sensor 58 whether or not heater 28a in fixing unit 28 is within an operable temperature range, and if not within the operable temperature range, turns heater 28a on to heat fixing unit 28 up to the operable temperature. Then, printing controller 40 rotates development and transfer process motor 51 via driver 50 and simultaneously turns charging high-voltage power supply 59 on with charge signal SGC to charge developer 14.

Then, existence and/or non-existence and type of paper 20 shown in FIG. 2 is detected by residual paper quantity sensor 56 and paper size sensor 57, and paper feed corresponding to paper 20 starts. Here, paper feed motor 53 can be rotated in both directions via driver 52. Paper feed motor 53 first rotates reversely and then feeds paper 20 by a predetermined amount until detected by paper intake port sensor 54. Then, paper feed motor 53 rotates forward to carry paper 20 into the printing mechanism of the printer.

When paper 20 reaches a printable position, printing controller 40 transmits timing signal SG3 (including main scanning synchronization signal and sub scanning synchronization signal) to an image processor (not shown) and receives video signal SG2. Video signal SG2, which is edited per page in the image processor and received by printing controller 40, is transferred to print heads 13 as printing data. Each of print heads 13 is configured as a plurality of light emitting thyristors arranged linearly for printing. Each of the light emitting thyristors is for a dot (pixel).

Transmission and reception of video signal SG2 is performed per printing line. Information to be printed by print heads 13 creates the latent image as high potential dots on photosensitive drums 11 (not shown) charged to a negative potential. Then, image forming toner charged to a negative potential is attracted to the dots by electric attraction to form a toner image.

Then, the toner image on photosensitive drum 11 is transported to a position opposite to transfer roller 27, while transfer high-voltage power supply 60 is put in the ON state with respect to positive potential by transfer signal SG4, and thus transfer roller 27 transfers the toner image onto paper 20 which passes between photosensitive drum 11 and transfer roller 27. Paper 20 containing the transferred toner image is carried in contact with fixing unit 28 incorporating heater 28a such that the toner image is fixed on paper 20 with heat applied by fixing unit 28. Paper 20 containing the fixed image is further carried from the printing mechanism of the printer and discharged outside of the printer through paper discharge port sensor 55.

In response to detection by paper size sensor 57 and paper intake port sensor 54, printing controller 40 applies voltage from transfer high-voltage power supply 60 to transfer roller 27 only when paper 20 passes through transfer roller 27. When printing ends and paper 20 passes through paper discharge port sensor 55, printing controller 40 ends application of voltage to developer 14 by charging high-voltage power supply 59 and simultaneously stops rotation of development and transfer process motor 51. Thereafter, operations described above are repeated.

(Printing Controller and Print Head According to Embodiment 1)

FIG. 1 is a block diagram illustrating a schematic circuit configuration of printing controller 40 and print head 13 shown in FIG. 5 according to Embodiment 1 of the invention.

Print head 13 and printing controller 40 are electrically connected to each other, for example, via a plurality of connection cables 70 (=70-1 to 70-3) and connection connectors 71 (=71-1 to 71-3) and 72 (=72-1 to 72-3).

The plurality of connection cables 70 (70-1 to 70-3) include, for example, a coaxial cable provided with a coaxial structure, an insulated wire, a twist pair wire (a pair of signal outward route core wire and signal inward route core wire arranged in proximity to each other and twisted together), a flexible flat cable, a flexible printed wiring board, and the like.

Print head 13 includes shift register 110 formed in IC chip 100 and light-emitting element array 200.

Shift register 110 is a circuit including a plurality of flip-flop circuits (hereinafter, referred to as "FF") 111 (111-1 to 111-n, . . . ), which receives serial data SI from connector 72-2 based on serial clock SCK as a clock signal input from connector 72-3 (hereinafter, just referred to as "clock"), outputs a plurality of trigger signals sequentially through a plurality of output terminals Q1 through Qn, . . . , and turns light-emitting element array 200 on and off. Each of FF111 includes input terminal D for data input, output terminal Q for data output and clock terminal CK for input of serial clock SCK. Input terminal D of a first-stage FF111-1 receives serial data SI, and output terminal Q of the FF111-1 is connected to input terminal D of a second-stage FF111-2. Thereafter, input and output terminals of subsequent stages are connected in the same way up to a final-stage FF111-n, . . . .

Shift register 110 is configured such that when serial clock SCK and serial data SI is fed from printing controller 40 via connectors 71-2 and 71-3, connection cables 70-2 and 70-3 and connection cables 72-2 and 72-3, shift register 110 inputs and shifts serial data SI sequentially from first-stage FF111-1 to final-stage FF111-$n$, . . . in synchronization with serial clock SGK and outputs shifted data through output terminals Q1 to Q$n$, . . . of each stage.

Shift register 110 is fabricated, for example, using a known CMOS structure on a silicon wafer substrate, or alternatively, using a known thin film transistor (TFT) on a glass substrate.

Light emitting element array 200 includes, for example, a plurality of N gate type light emitting thyristors 210 (210-1 to 210-$n$, . . . ) which are three-terminal light emitting elements. In each of the light emitting thyristors 210, a first terminal thereof (for example, cathode) is connected to a first power supply (for example, ground GND=0V), a second terminal (for example, anode) is connected to common terminal IN through which drive current Iout flows, and a first control terminal (for example, gate) is connected to a corresponding one of output terminals Q1 to Q$n$, . . . of shift register 110. Light emitting thyristors 210 are elements which emit light, with substantial supply voltage VDD applied between the anode and the cathode when "L"-level trigger signal is input to the state and thereby the anode-to-cathode is turned on. For a print head capable of printing with 600 dots resolution per inch on A4 size paper, for example, 4992 FF111-1 to FF111-$n$, . . . of shift register 110 and 4992 light emitting thyristors 210-1 to 210-$n$, . . . are arrayed in total.

Printing controller 40 includes circuits (not shown) which provide, to print head 13, ON/OFF command signal DRVON-N (however, "–N" represents a negative logic) as a drive signal instructing ON/OFF of light emitting element arrays 200, and serial data SI and serial clock SCK, which are control signals with respect to shift register 110, and a plurality of drive circuits 41 which drive a plurality of light emitting element arrays 200 in a time division manner. In FIG. 1, only one drive circuit 4 is shown in order to simplify the description. The plurality of light emitting element arrays 200 include, for example, a total of 4992 light emitting thyristors 210-1 through 210-$n$, and are configured such that a plurality of light emitting thyristor sets are grouped and divided drive of drive circuit 41 provided each per group is performed in parallel in real time.

A drive device according to Embodiment 1 includes drive circuits 41 on the side of printing controller 40 and shift registers 110 on the side of print head 13.

Citing a typical design as an example, 26 chips of light emitting element array 200 formed by arranging 192 light emitting thyristor 210 (210-1 to 210-$n$) are regularly positioned on printed board 13$b$ shown in FIG. 4. This configuration includes a total of 4992 light emitting thyristors 210-1 to 210-$n$, . . . required for print head 13. Drive circuit 41 is disposed in association with 26 light emitting element array 200 described above, and the total number of output terminals in drive circuit 41 is 26. Although FIG. 1 shows drive circuit 41 disposed inside printing controller 40, drive circuit 41 may be disposed in print head 13.

Drive circuit 41 includes CMOS inverter 42 which inverts and then outputs ON/OFF command signal DRVON-N to data terminal DA. CMOS inverter 42 includes first MOS transistor of a first conduction state (for example, P-channel MOS transistor, hereinafter referred to as "PMOS") 43 and second MOS transistor of a second conduction state (for example, N-channel MOS transistor, hereinafter referred to as "NMOS") 44, which are connected in series with each other between a second power supply (for example, power supply of supply voltage VDD) and ground GND.

That is, in PMOS 43, ON/OFF command signal DRVON-N is input to a second control terminal (for example, gate), a third terminal (for example, source) is connected to the VDD power supply, a fourth terminal (for example, drain) is connected to data terminal DA, and a substrate terminal is connected to a third power supply (for example, power supply of supply voltage VDD5) having a potential different from the potential of the VDD power supply (for example, potential higher than VDD power supply). In NMOS 44, ON/OFF command signal DRVON-N is input to a gate, a source is connected to ground GND, and a drain is connected to data terminal DA. Data terminal DA is connected to common terminal IN on the side of light emitting element array 200 via connection connector 71-1, connection cable 70-1 and connection connector 72-1.

(Light Emitting Thyristor According to Embodiment 1)

FIG. 6A to FIG. 6D are configuration diagrams illustrating light emitting thyristor 210 shown in FIG. 1.

FIG. 6A shows circuit symbols of light emitting thyristor 210 having three terminals including anode A, cathode K and gate G.

FIG. 6B is a diagram illustrating the cross-sectional structure of light emitting thyristor 210. Light emitting thyristor 210 is fabricated by epitaxially growing a predetermined crystal on an upper layer of, for example, GaAs wafer substrate by a known MO-CVD (Metal Organic-Chemical Vapor Deposition) technique.

That is, after epitaxial growth of a predetermined buffer layer and sacrifice layer (not shown), a wafer of an NPN three-layer structure including N-type layer 211 containing an N-type impurity, P-type layer 212 containing a P-type impurity and N-type layer 213 containing an N-type impurity formed sequentially on an AlGaAs material. Then, using a known photolithography technique, P-type impurity region 214 is formed selectively at a portion of topmost N-type layer 213. Further, a groove section (not shown) is formed by a known etching technique to separate elements. Further, in the above-described etching process, a portion of N-type region 211 which becomes a bottom layer of light emitting thyristor 210 is exposed, and a metal wire is formed at the exposed region to form cathode K. Simultaneously, anode A and gate G are formed respectively at P-type region 214 and N-type region 213.

FIG. 6C is a cross-sectional structure diagram illustrating another aspect of light emitting thyristor 210. Light emitting thyristor 210 of this cross-sectional structure is fabricated through epitaxial growth of a predetermined crystal on an upper layer of, for example, a GaAs substrate by a known MO-CVD technique.

That is, after epitaxial growth of a predetermined buffer layer and sacrifice layer (now shown), an wafer of a PNPN four-layer structure is formed by sequentially forming N-type layer 211 containing an N-type impurity, P-type layer 212 containing a P-type impurity, N-type layer 213 containing an N-type impurity and P-type layer 215 containing a P-type impurity on an AlGaAs material. Further, a groove section (not shown) is formed using a known etching technique to separate elements. Further, in the etching process described above, a portion of N-type region 211 which becomes a bottom layer of light emitting thyristor 210 is exposed, and a metal wire is formed at the exposed region to form cathode K. Similarly, a portion of P-type region 215 which becomes a topmost layer is exposed, and a metal wiring is formed at the exposed region to form anode A. Simultaneously, gate G is formed at N-type region 213.

FIG. 6D is an equivalent circuit diagram of light emitting thyristor 210 drawn in comparison with FIGS. 6B and 6C. Light emitting thyristor 210 includes PNP transistor (hereinafter referred to as "PNPTR") 221 and NPN transistor (hereinafter referred to as "NPNTR") 222. An emitter of PNPTR 221 corresponds to anode A of light emitting thyristor 210, a base of PNPTR 221 corresponds to gate G of light emitting thyristor 210, and an emitter of NPNTR 222 corresponds to cathode K of light emitting thyristor 210. Further, a collector of PNPTR 221 is connected to a base of NPNTR 222, and a base of PNPTR 221 is connected to a collector of NPNTR 222.

Although light emitting thyristor 210 shown in FIG. 6 has an AlGaAs layer formed on a GaAs wafer substrate, the material is not limited thereto, and materials such as GaP, GaAsP or AlGaInP may be used alternatively. Moreover, the layer may be formed on a sapphire substrate using such materials as GaN, AlGaN and InGaN.

Light emitting thyristor 210 shown in FIG. 6 is bonded to an IC wafer on which shift register 110 is formed, by, for example, an epitaxial film bonding technique, and connection terminals therebetween are wired using a photolithography technique. Further, light emitting thyristor 210 is separated to a plurality of chips using a known dicing technique to form a composite chip including IC chip 100 and light emitting element array 200 as shown in FIG. 4.

(PMOS Shown in FIG. 1)

Figure 7B:
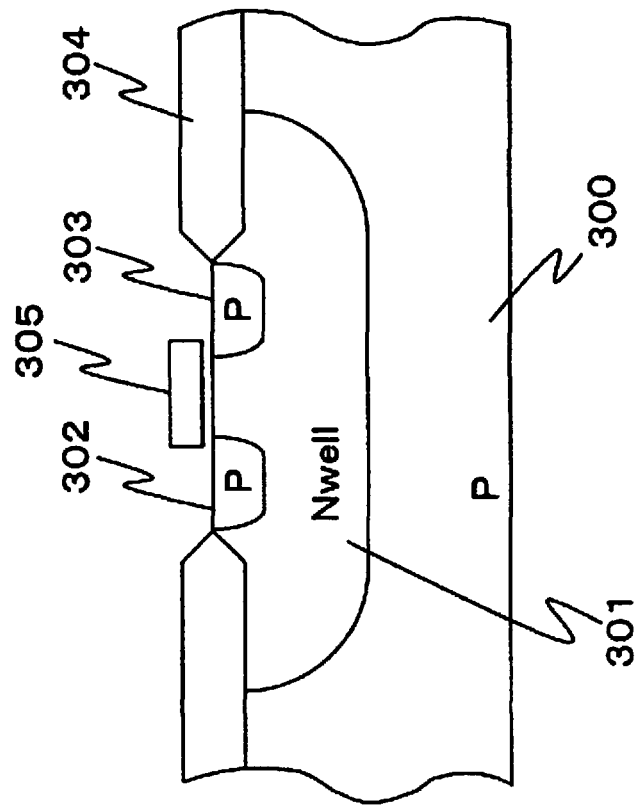
FIGS. 7A and 7B are diagrams illustrating a configuration of PMOS 43 in FIG. 1.
Figure 7A:
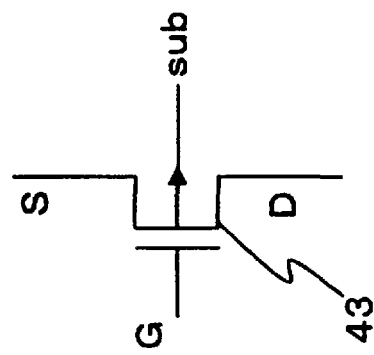

FIGS. 7A to 7C are configuration diagrams illustrating PMOS 43 shown in FIG. 1.

FIG. 7A shows circuit symbols of PMOS 43 having four terminals including drain D, gate G, source S and substrate terminal sub. FIG. 7B is a cross-sectional view illustrating a vertical cross section of PMOS 43 in the channel direction.

As shown in FIG. 7B, PMOS 43 is formed on substrate 300 made of, for example, a P-type silicon wafer, together with NMOS 44 shown in FIG. 1. In the surface of substrate 300, NMOS 44 (not shown) is formed, and substrate region (for example, an N well region (Nwell)) 301 for forming PMOS is formed in substrate 300 to electrically separate PMOS 43 with respect to NMOS 44. N well region 301 is formed by diffusing an N-type impurity in the form of islands in substrate 300. In N well region 301, source region 302 and drain region 303 are formed opposed to each other by diffusing a P-type impurity.

Gate portion 305 made of polysilicon is formed on a region whereupon a channel is to be formed between source region 302 and drain region 303, via a gate insulating film (not shown). Source region 302 and drain region 303 are formed by diffusing a P-type impurity in substrate 300 with gate portion 305 as a mask. PMOS 43 includes source region 302, drain region 303 and gate section 305, and field oxide film 304 is formed around source region 302 and drain region 303 so as to electrically separate PMOS 43 from other elements (not shown).

Metal electrodes (not shown) are formed on contact regions of source region 302, drain region 303 and gate portion 305, and substrate terminal sub is connected to N well region 301, source S to source region 302, drain D to drain region 303, and gate G to gate portion 305 respectively. All of such regions are covered with a passivation film (not shown).

(Schematic Operation of Printing Controller and Print Head According to Embodiment 1)

In FIG. 1, for example, when ON/OFF command signal DRVON-N in printing controller 40 is at "H" level, PMOS 43 constituting CMOS inverter 42 is turned OFF, NMOS 44 is turned ON, and data terminal DA on the output side turns to "L" level (0V). Consequently, voltage of common terminal IN on the side of print head 13 becomes substantially 0V via connection connector 71-1, connection cable 70-1 and connection connector 72-1. Drive current Iout flowing to an anode of light emitting thyristors 210 becomes zero, and all of light emitting thyristors 210-1 to 210-n are in a non-light emitting state.

On the contrary, when ON/OFF command signal DRVON-N is at "L" level, PMOS 43 constituting CMOS inverter 42 is turned ON, NMOS 44 is turned OFF, and data terminal DA on output side turns to "H" level. Consequently, drive current Iout flows into an anode of light emitting thyristors 210 via connection connector 71-1, connection cable 70-1, connection connector 72-1 and common terminal IN on the side of print head 13, and "L" level trigger signal is applied to gates of light emitting thyristors having a light emission command from shift register 110 out of light emitting thyristors 210-1 to 210-n, whereby such light emitting thyristors are selectively put in a light emitting state.

Here, in PMOS 43, a source is connected to the VDD power supply, a substrate terminal is connected to the VDD5 power supply, and in a typical design example, voltage of the VDD power supply is set to 3.3V and voltage of the VDD5 power supply is set to 5V. Since a potential difference is established between the source and substrate terminal of PMOS 43 in this way, substrate bias effect is generated in PMOS 43 such that threshold voltage Vtp increases depending on the potential difference thereof.

Consequently, PMOS 43 operates in a saturation region, and drain current Id thereat is given by the following formula, as well known from a theory of electronic device physics.

$$Id = K \times (W/L) \times (Vgs - Vtp)^2$$

Where;
K: Constant
W: Gate width of PMOS 43
L: Gate length of PMOS 43
Vtp: Threshold voltage of PMOS 43
Vgs: Gate-to-source voltage of PMOS 43 (supply voltage VDD)

As apparent from the above formula, drain current Id of PMOS 43, that is, drive current Iout of light emitting thyristor 210 can be varied by adjusting voltage of the VDD power supply and the VDD5 power supply. Moreover, in MOS transistors operating in a saturation region, like PMOS 43, drain current can be kept at a predetermined value by setting the element size thereof appropriately even when there is a slight variation of the drain potential. Such characteristic is known as a constant current characteristic of the MOS transistor, and preferably, gate length L is set to have a larger value in order to obtain a good characteristic.

Further, in drive circuit 41 shown in FIG. 1, NMOS 44 is provided to turn data terminal DA to "L" level. However, in a case where there is no need of high speed switching of light emitting thyristor 210, NMOS 44 may be omitted since light emitting thyristors 210-1 to 210-n can be turned off by shutting off drive current Iout with PMOS 43 turned off.

(Detailed Operations of Printing Controller and Print Head According to Embodiment 1)

Figure 8:
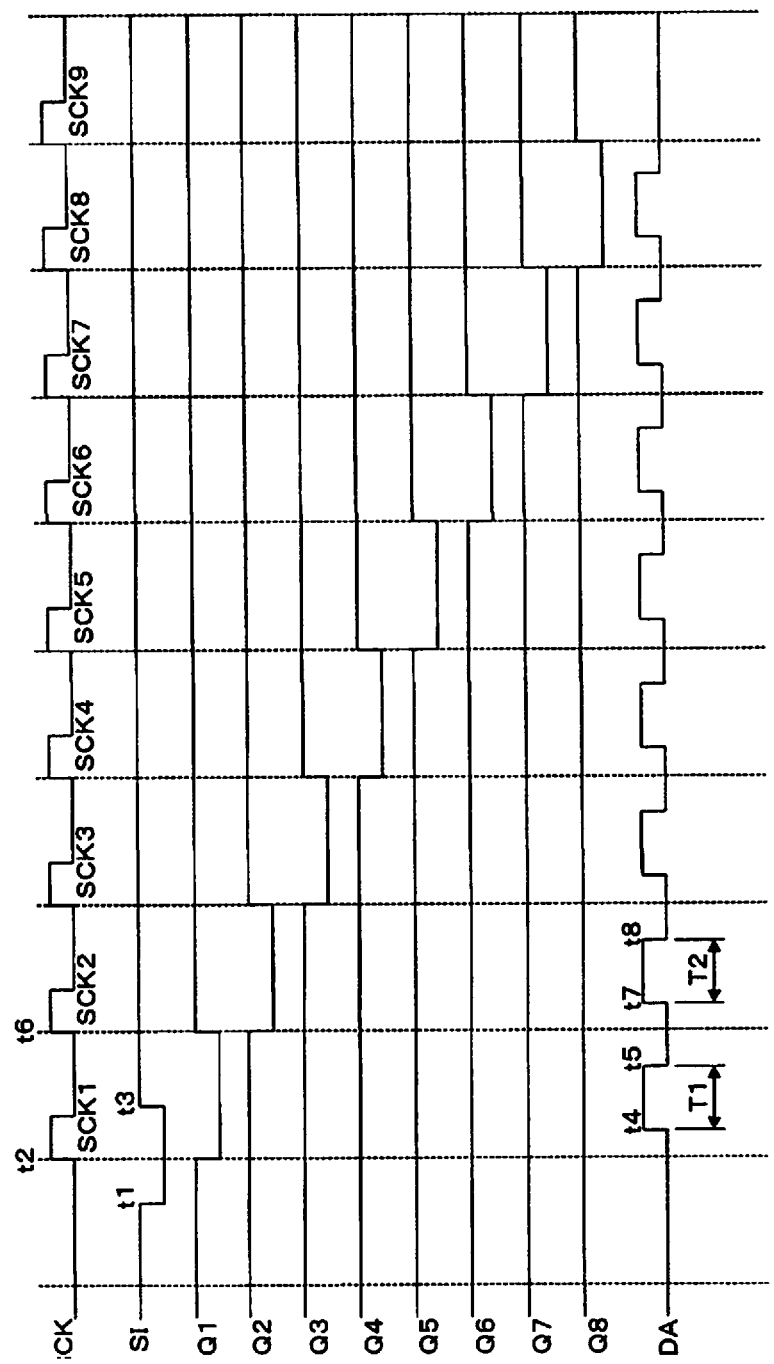
FIG. 8 is a time chart illustrating operations shown in FIG. 1.

FIG. 8 is a time chart illustrating detailed operations of print head 13 and printing controller 40 shown in FIG. 1.

FIG. 8 shows operation waveforms when light emitting thyristors 210-1 to 210-n (for example, n=8) shown in FIG. 1 are lit sequentially in one line scanning during printing operations of image forming apparatus 1 shown in FIG. 2.

First, as a preliminary operation when image forming apparatus 1 is powered on, shift register 110 shown in FIG. 1 is reset. In this reset operation, serial data SI is kept at "H"

level, and clock pulse of serial clock SCK of the number corresponding to the number of stages of shift register 110 (for example, n=8) is input to shift register 110 via connection connector 71-3, connection cable 70-3 and connection connector 72-3, whereby serial data SI of "H" level is input to all shift registers 111-1 to 111-8 via connection connector 71-2, connection cable 70-2 and connection connector 72-2, and all output terminals thereof Q1 to Q8 turn to "H" level.

Prior to one line scanning, serial data SI is set to "L" level at time t1 shown in FIG. 8. Then, first pulse SCK1 of serial clock SCK is input at time t2. When first pulse SCK1 rises, serial data SI is loaded into first-stage FF111-1 in shift register 110 via connection connector 71-2, connection cable 70-2 and connection connector 72-2, and with a slight delay behind thereof, output terminal Q1 of first-stage FF111-1 shifts to "L" level. After first pulse SCK1 rises, serial data SI is turned to "H" level again at time t3.

When output terminal Q1 of first-stage FF111-1 is turned to "L" level, gate potential of light emitting thyristor 210-1 drops. Then, ON/OFF command signal DRVON-N is turned to "H" level at time t4, whereby NMOS 44 of CMOS inverter 44 is turned ON to turn data terminal DA to "L" level, whereby a potential difference is caused between the anode and the gate of light emitting thyristor 210-1 via connector 71-1, connection cable 70-1, connector 72-1 and common terminal IN. Consequently, "L" level trigger signal by shift register 110 turns on light emitting thyristor 210-1 and puts light emitting thyristor 210-1 in a light emitting state.

The light emitting state of light emitting thyristor 210-1 is caused mainly by current flowing between the anode and the cathode. Therefore, to turn off light emitting thyristor 210-1 once turned on, voltage applied between the anode and the cathode must be dropped to substantially 0V. For this reason, ON/OFF command signal DRVON-N is turned to "H" level at time t5. Then, NMOS 44 of CMOS 42 is turned on to turn data terminal DA to "L" level, whereby voltage between the anode and the cathode of light emitting thyristor 210-1 drops down to substantially 0V and light emitting thyristor 210-1 is turned off.

As described above, light-emission output of light emitting thyristors 210-1 to 210-8 is generated mainly by the current value of drive current Iout flowing between the anode and the cathode thereof. Therefore, drive current Iout of light emitting thyristor 210 can be kept at a predetermined value using drive circuit 41 having the constant current characteristic as a drive signal source in FIG. 1, even when a slight element variation occurs in the anode-to-cathode voltage when light emitting thyristor 210 emits light.

In FIG. 8, data terminal DA is turned to "H" level at time t4 to cause light emitting thyristors 210-1 to emit light, and turned to "L" level at time t5 to turn off the light emitting thyristors. If there is no need to have light emitting thyristor 210-1 emit light, data terminal DA may be held at "L" level between t4 and t5. In this way, light-emitting state and non-light-emitting state of light emitting thyristor 210-1 can be switched by the logic level of data terminal DA.

Then, second pulse SCK2 of serial clock SCK rises at time t6. Since serial data SI is at "H" level at that time, output terminal Q1 of first-stage FF111-1 in shift register 110 shifts to "H" level with a slight delay therefrom, while output terminal Q2 of second-stage FF111-2 changes to "L" level. At time t7, ON/OFF command signal DRVON-N is turned to "L" level, whereby PMOS 43 of CMOS 42 is turned on and data terminal DA is turned to "H" level. Consequently, a potential difference occurs between the anode and the cathode of light emitting thyristor 210-2, and "L" level trigger signal by shift register 110 turns on light emitting thyristor 210-2 to the light-emitting state.

Since the light-emitting state of light emitting thyristor 210-2 is generated mainly by the current value of drive current Iout flowing between the anode and the cathode, voltage applied between the anode and the cathode must be dropped to substantially 0V to turn off light emitting thyristor 210-2 once turned on. For this reason, ON/OFF command signal DRVON-N is turned to "H" level at time t8, whereby NMOSS 44 of CMOS inverter 42 is turned ON and potential of data terminal DA turns to "L" level, whereby voltage between the anode and the cathode of light emitting thyristor 210-2 drops to substantially 0V and light emitting thyristor 210-2 is turned off.

Thus, whenever first pulse SCK1, second pulse SCK2, third pulse SCK3, fourth pulse SCK4, fifth pulse SCK5, sixth pulse SCK6, seventh pulse SCK7, eighth pulse SCK8 or ninth pulse SCK9 of serial clock SCK rises, only one output terminal Q out of first output terminal Q1, second output terminal Q2, third output terminal Q3, fourth output terminal Q4, fifth output terminal Q5, sixth output terminal Q6, seventh output terminal Q7 or eighth output terminal Q8 is turned to "L" level sequentially with other output terminals Q turned to "H" level. For this reason, when serial data SI is at "H" level, only a light emitting thyristor connected to a corresponding output terminal at "L" level selectively emit light, out of light emitting thyristors 210-1 to 210-8 connected to output terminals Q1 to Q8.

At that time, light emitting thyristors 210-1 to 210-8 can be turned on by only supplying potential difference biasing to the anode-to-cathode of light emitting thyristors 210-1 to 210-8 in the forward direction to give a gate signal of "L" level. Also, light emitting thyristors 210-1 to 210-8 can be held off by only keeping the anode-to-gate potential difference below the forward voltage, and the potential difference may be set to 0V and voltage may be applied in the reverse direction.

Further, drive time T1 between times t4 and t5 at light emitting thyristor 210-1, drive time T2 between times t7 and t8 at light emitting thyristor 210-2, and the like shown in FIG. 8 may be different. Even if any variation in the light emitting efficiency of light emitting thyristors 210-1 to 210-8 or the like occur, it is easy to control drive times T1, T2 and the like to different values in order to obtain a predetermined exposure energy by correcting the variation.

(Operation of Light Emitting Thyristor According to Embodiment 1)

Figure 9A:
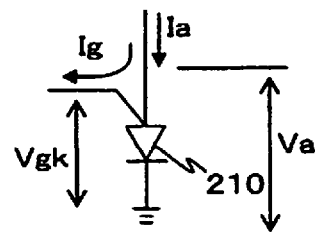
FIGS. 9A to 9D are diagrams illustrating operations of the turn-on step in light emitting thyristor 210 shown in FIG. 6.
Figure 9B:
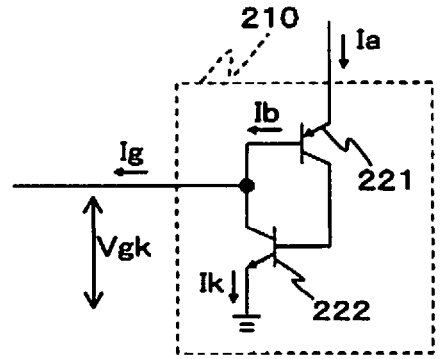
Figure 9C:
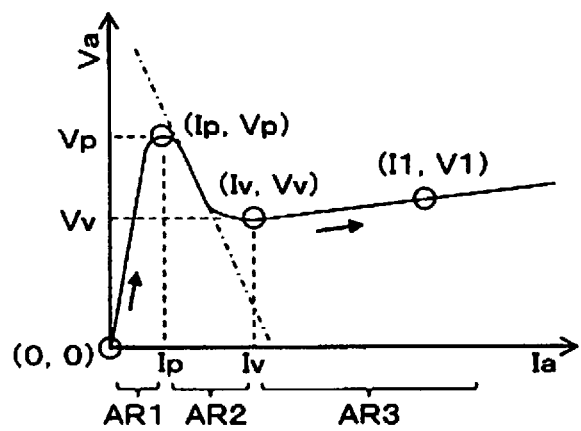
Figure 9D:
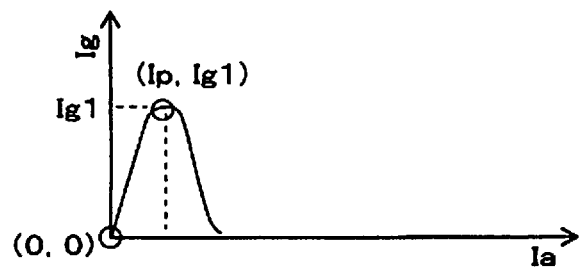

FIGS. 9A to 9C are diagrams illustrating operations of turn-on steps in light emitting thyristor 210 shown in FIG. 6. FIG. 9A is a diagram illustrating symbols of light emitting thyristor 210 and signs of voltage and current of terminals, FIG. 9B is a diagram illustrating an equivalent circuit of FIG. 9A, and FIGS. 9C and 9D are diagrams illustrating operation waveforms.

In light emitting thyristor 210 shown in FIG. 9A, Va, Vgk, Ia and Ig represent the anode voltage, the gate-to-cathode voltage, the anode current, and the gate current respectively.

In FIG. 9B, an equivalent circuit of light emitting thyristor 210 encircled by the broken line includes PNPTR 221 and NPNTR 222.

For example, the turn-on process of light emitting thyristor 210 is described assuming that the gate is at "L" level.

To drive light emitting thyristor 210, output voltage of a gate drive circuit (not shown) is turned to "H" level, whereby anode current Ia is generated. Then, anode current Ia flows through a PN junction between the anode and the gate of light emitting thyristor 210, that is, in the forward direction between the emitter and the base of NPNTR 221, thereby generating gate current Ig. The flow of gate current Ig generates anode voltage Va at light emitting thyristor 210.

Gate current Ig corresponds to base current Ib of PNPTR 221 in light emitting thyristor 210. The flow of base current Ib initiates shift of PNPTR 221 to the on state, thereby generating collector current in a collector of PNPTR 221. The collector current turns a base current of NPNTR 222, which shifts NPNTR 222 to the on state. The collector current generated thereby increases the base current of PNPTR 221 and thereby accelerates shift of PNPTR 221 to the ON state.

On the other hand, after NPNTR 222 shifts to the ON state completely, the collector-to-emitter voltage thereof, that is, gate-to-cathode voltage Vgk, drops. When gate-to-cathode voltage Vgk becomes below "L" level output voltage (VoL) of a gate drive circuit (not shown), gate current Ig flowing from the gate of light emitting thyristor 210 to an output terminal of the gate drive circuit becomes substantially zero. Consequently, cathode current Ik substantially equal to anode current Ia flows into the cathode of light emitting thyristor 210, whereby light emitting thyristor 210 is turned to the on state completely.

FIG. 9C is a diagram illustrating a turn-on step of light emitting thyristor 210, in which the abscissa indicates anode current Ia and the ordinate indicates anode voltage Va.

When light emitting thyristor 210 is turned out, anode current Ia is substantially zero, which corresponds to the origin (0,0) of a graph shown in FIG. 9C. As light emitting thyristor 210 initiates the turn-on, anode is driven, and anode voltage Va rises as shown by an arrow in FIG. 9C and reaches anode voltage Vp at the peak point thereof.

Anode-to-gate voltage Vag of light emitting thyristor 210 is equal to emitter-to-base voltage Vbe of PNPTR 221, and there is a relation of Vp=Vag+VoL between "L" level output voltage (VoL) of the gate drive circuit and anode voltage Vp at the peak point. When anode voltage Vp at the peak point is applied in the forward direction, gate current Ig (base current Ib of PNPTR 221) is generated. In FIG. 9C, an encircled point (Ip, Vp) corresponds to a boundary between OFF region AR1 and ON region AR2 of light emitting thyristor 210.

As anode current Ia further increases from anode current Ip at the peak point, a point represented by (Ip, Vp), anode voltage Va drops down to an encircled point (Iv, Vv) which corresponds to a boundary between ON shift region AR2 and ON region AR3 of light emitting thyristor 210. At that time, gate current Ig drops down to substantially zero, and a gate drive circuit (not shown) is substantially in a state equivalent to that the gate drive circuit is separated from light emitting thyristor 210.

As anode current Ia further increases from point (Iv, Vv), anode voltage Va increases up to encircled point (I1, V1) which represents a final operating point of light emitting drive of light emitting thyristor 210, in which light emitting drive with a predetermined light emitting power is performed by anode current Ia (=I1) equal to drive current Iout supplied from drive circuit 41 shown in FIG. 1.

FIG. 9D is a diagram corresponding to FIG. 9C, in which the abscissa indicates anode current Ia and the ordinate indicates gate current Ig. FIG. 9D shows a relation between gate current Ig generated at the turn-on step of light emitting thyristor 210 described above and the peak value Ig1 thereof and a relation between anode voltage Vp and anode current Ip described above.

ON shift region AR2 shown in FIG. 9C is characterized in that anode voltage Va drops as anode current Ia increases, and negative resistance is exhibited between the anode and the cathode in ON shift region AR2. Shown by single dotted line in FIG. 9C is a tangential line of a characteristic line in the negative resistance region mentioned above, with the slope thereof corresponding to the negative resistance value. The negative resistance value fluctuates depending on fabrication variation, chip temperature, or the like of light emitting thyristor 210, and typically reaches thousands of ohms.

On the contrary, a conventional drive circuit (corresponding to drive circuit 41 shown in FIG. 1) includes a CMOS inverter (corresponding to CMOS inverter 42 shown in FIG. 1) including PMOS and NMOS, and a current limit resistor connected between an output side of the CMOS inverter and an anode (corresponding to an anode of the light emitting thyristor shown in FIG. 1) of the light emitting thyristor. A typical resistance value of the current limit resistor is set, for example, to 180 ohm. Therefore, to drive light emitting thyristor 210 having characteristics shown in FIG. 9 using the conventional drive circuit, the turn-on step thereof shifts from the origin (0, 0) of a graph shown in FIG. 9C to point (Iv, Vv) via point (Ip, Vp) as shown by an arrow in FIG. 9C, and light emitting drive takes place finally at point (I1, V1). Since, the ON shift step passes via a negative resistance region shown by ON shift region AR2, there is a problem that output of the resistance value (substantially equal to a resistance value of the current limit resistor mentioned above) oscillates in the ON shift region AR2 since the output resistance is lower than a negative resistance value of light emitting thyristor 210.

In order to solve such problems, drive circuit 41 according to Embodiment 1 includes PMOS 43 in CMOS inverter 42 configured as shown in FIG. 7 by omitting the conventional current limit resistor. Hereinafter, transistor characteristics of PMOS 43 according to Embodiment 1 are described.

(Transistor Characteristics of PMOS According to Embodiment 1)

Figure 10B:
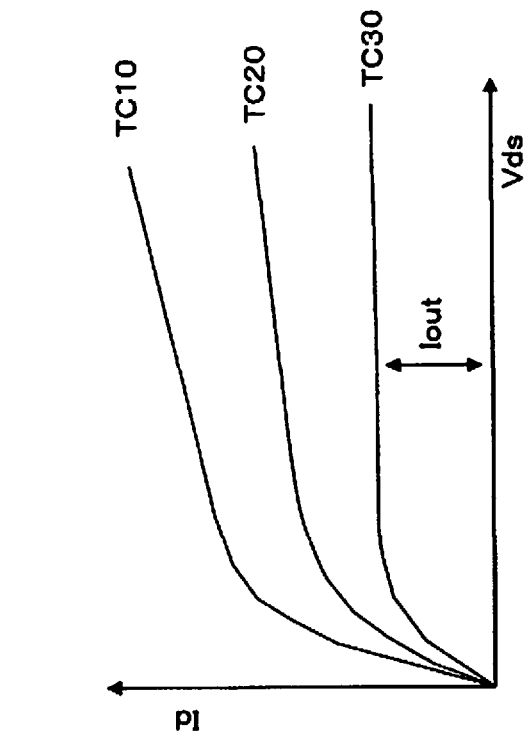
FIGS. 10A and 10B are diagrams illustrating transistor characteristics of PMOS 43 shown in FIG. 7.
Figure 10A:
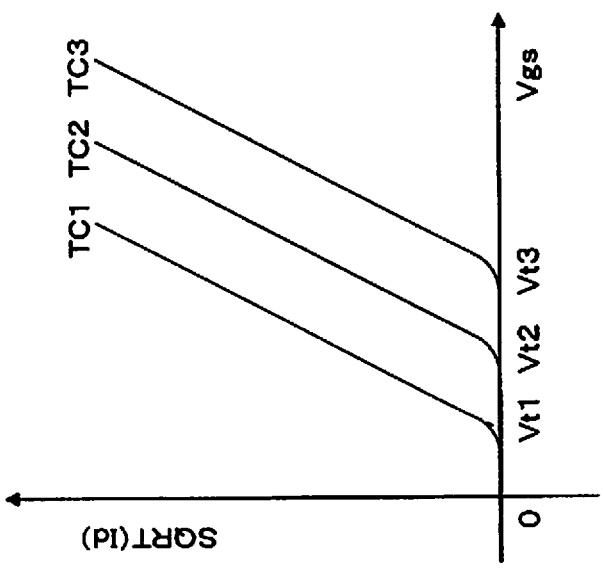

FIGS. 10A and 10B are diagrams illustrating transistor characteristics of PMOS 43 shown in FIG. 7.

FIG. 10A is a diagram illustrating a relation between the gate voltage and the drain current of PMOS 43, in which the abscissa indicates gate-to-source voltage Vgs, and the ordinate indicates a square root of the drain current as SQRT (Id).

In FIG. 10A, for example, curve TC1 varies substantially in a linear fashion as gate-to-source voltage Vgs increases, and a point where the tangential line and the abscissa in curve TC1 intersects each other represents threshold voltage Vt1. Further, curve TC1 indicates a state where there is no potential difference between source and substrate terminals in FIG. 1. On the contrary, when substrate terminal potential VDD5 is increased beyond source potential VDD of PMOS 43 as shown in FIG. 1, threshold voltage Vt1 shifts in a direction in which it increases, as shown by curve TC2 (threshold voltage at that time is Vt2). Such characteristic changes are phenomena known as substrate bias effects. When substrate terminal voltage VDD5 is further increased beyond source voltage VDD of PMOS 43 to a state, for example, VDD-3.3V and VDD5=5V, such state can be shown by curve TC3.

FIG. 10B is a diagram schematically illustrating a relation between the drain voltage and the drain current when gate-to-source voltage Vgs is made substantially equal to supply voltage VDD in PMOS 43, in which the abscissa and the ordinate indicate drain-to-source voltage Vds and drain current Id respectively.

In FIG. 10B, Curve TC 10, Curve TC 20 and Curve TC30 correspond to Curves TC1, TC2 and TC3 in FIG. 10A respectively. For example, Curve TC10 is characterized in that a large value of drain current Id can be obtained, while drain current Id also increases as drain-to-source voltage Vds increases. Curve TC30 is characterized in that a value of drain current Id becomes lower than that shown in Curve TC10, but if drain-to-source voltage Vds is higher than a predetermined value, drain current ID can be regarded substantially constant as drive current Iout, and constant current characteristics not dependent on drain-to-source voltage Vds is obtainable.

To describe the above relation quantitatively, drain current Id of PMOS 43 can be obtained from the following formula as well known from a theory of electronic device physics:

$$Id = K \times (W/L) \times (Vgs - Vtp)^2$$

where;
K: Constant
W: Gate width of PMOS 43
L: Gate length of PMOS 43
Vgs: Gate-to-source voltage of PMOS 43
Vtp: Threshold voltage of PMOS 43

As described using FIG. 1 and FIG. 7, the source and the substrate terminal of PMOS 43 are separated from each other in drive circuit 41 according to Embodiment 1, and a potential difference is established therebetween such that voltage of substrate terminal (VDD5) is higher than the source voltage (VDD), whereby threshold voltage Vtp of PMOS 43 can be increased by substrate bias effects caused thereby and drain current Id can be adjusted by the substrate terminal voltage (VDD5).

At that time, voltage applied between the gate and the source of PMOS 43 is 3.3V at most, substantially equal to supply voltage VDD. Consequently, as threshold voltage Vtp described above increases, overdrive voltage AV (=Vgs−Vt) decreases and PMOS 43 operates in the saturation region.

The ratio between gate width W and gate length L of PMOS 43 can be changed relatively freely and in a wide range at the design stage of PMOS 43. Moreover, threshold voltage Vtp can be adjusted as described above, and drain current Id also can be adjusted relatively freely.

Further, in PMOS 43, even when there is a slight fluctuation in the drain voltage, a drain current value can be maintained at a predetermined value by setting gate length L to a slightly higher value. Such characteristics are known as constant current characteristics of PMOS, and gate length L of PMOS 43 is preferably set to a slightly higher value so as to obtain good characteristics.

When PMOS 43 mentioned above operates at constant current, the output resistance value thereof becomes extremely high (ideally, infinite), whereby a load line drawn in a characteristic curve of light emitting thyristor 210 shown in FIG. 9 becomes a substantially vertical line, which intersects the characteristics line of light emitting thyristor 210 at a single point.

With a configuration as described above, drive circuit 41 according to Embodiment 1 solves the conventional problem of oscillation of light emitting thyristor 210 caused by the negative resistance.

(Advantageous Effects According to Embodiment 1)
According to Embodiment 1, effects (1) to (3) described below are provided.

(1) According to a drive device including drive circuit 41 according to Embodiment 1 and print head 13 driven thereby, the substrate bias effect is supplied to PMOS 43 in drive circuit 41 to increase threshold voltage Vtp so as to achieve constant current driving by PMOS 43 operating in a saturation region. Therefore, the output resistance value of drive circuit 41 can be higher than the negative resistance value of light emitting thyristor 210, whereby oscillation resulting from the negative resistance is prevented.

(2) Connection cable 70-1 intervenes between drive circuit 41 and light emitting thyristor 210, and resistance resulting from wiring therebetween causes voltage drop. However, drive circuit 41 according to Embodiment 1 has substantially constant current characteristics such that the value of drive current can be maintained substantially constant even when there is a voltage drop due to connection cable 70-1, whereby there is an effect that no fluctuation occurs in the drive energy of light emitting thyristor 210.

(3) According to image forming apparatus 1 according to Embodiment 1, print head 13 adopted thereto provides high quality image forming apparatus 1 having good space efficiency and light extraction efficiency. That is, by using print head 13, such effects can be obtained in not only full-color image forming apparatus 1 but also monochrome and multiple color image forming apparatuses. In particular, more significant effects are obtained in full-color image forming apparatus 1 which needs numerous print heads 13 as exposure devices.

Embodiment 2

Figure 11:
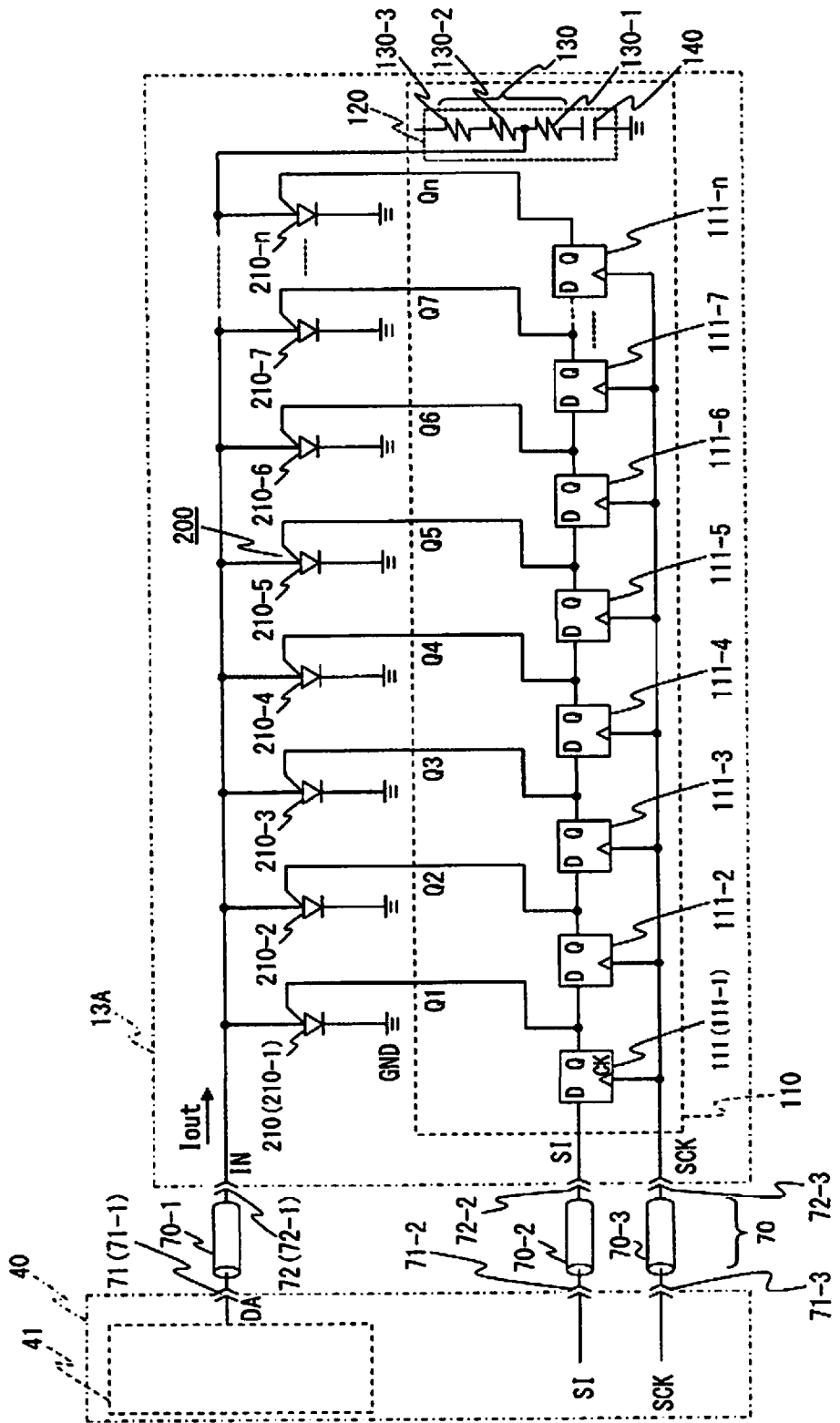
FIG. 11 is a plotter diagram illustrating a circuit configuration of a printing controller and a print head according to Embodiment 2 of the invention.

(Printing Controller and Print Head According to Embodiment 2)
FIG. 11 is a block diagram illustrating a schematic circuit configuration of a printing controller and a print head according to Embodiment 2 of the invention, in which common signs are assigned to elements common to those in FIG. 1 showing Embodiment 1.

In image forming apparatus 1 according to Embodiment 2, the circuit configuration of print head 13A is different from print head 13 according to Embodiment 1. Print head 13A according to Embodiment 2 includes shift register 110 and light emitting element array 200 which are the same as those according to Embodiment 1, and newly added terminating circuit 120.

Terminating circuit 120 is disposed at a terminating portion of light emitting element 200 and connected to common terminal IN. Terminating circuit 120 includes a series circuit of a plurality of termination resistances 130 (130-1, 130-3, . . . ) and capacitor 140, in which a connecting point of a specific termination resistance (for example, a connecting point between termination resistances 130-1 and 130-2) is connected to common terminal IN, and termination resistance 130-1 and capacitor 140 are connected in series with each other between common terminal IN and a ground potential terminal (ground).

Other configurations are same as those according to Embodiment 1.

(Termination Resistance According to Embodiment 2)
FIG. 12A to 12D are configuration diagrams illustrating terminal resistances 130 in FIG. 11.

Figure 12A:
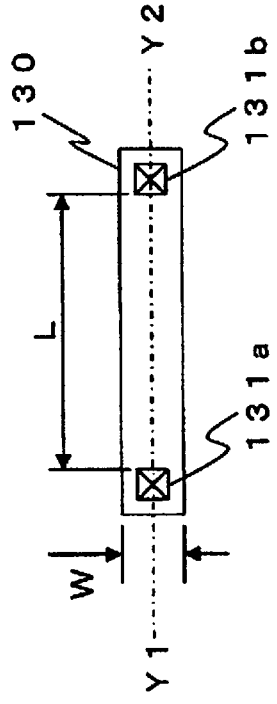
FIGS. 12A to 12D are diagrams illustrating a configuration of the termination resistance shown in FIG. 11.
Figure 12B:
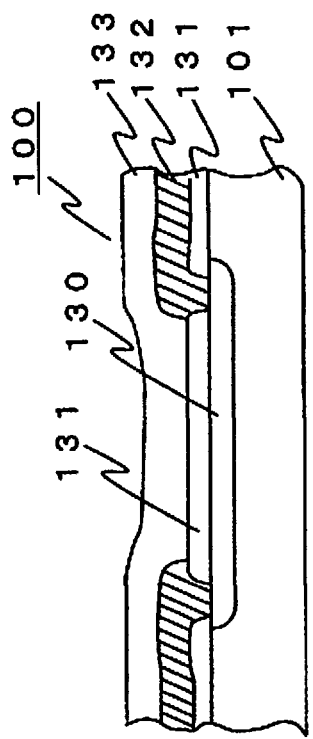
Figure 12C:
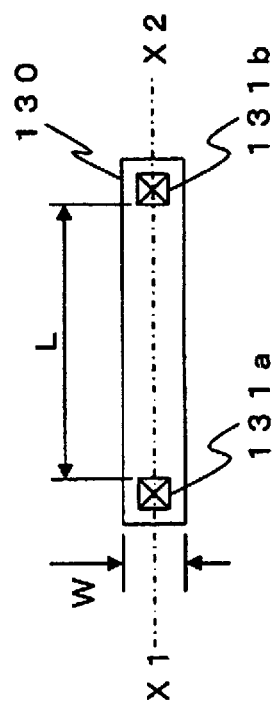
Figure 12D:
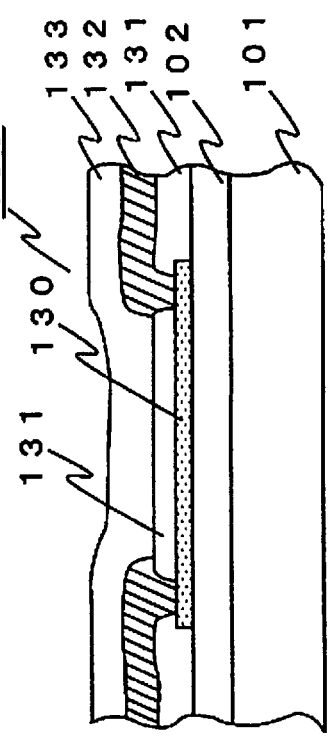

FIG. 12A and FIG. 12C are plan views illustrating a configuration example of termination resistance 130 formed at a specific portion of IC chip 100 in FIG. 4, FIG. 12B is a cross sectional view cut along Line X1-X2 in FIG. 12A, and FIG. 12D is a cross section view cut along Line Y1-Y2 in FIG. 12C.

Termination resistance 130 shown in FIG. 12A and FIG. 12C is disposed in IC chip 100 shown in FIG. 4 on which shift register 110 shown in FIG. 1 is formed. Termination resistance 130 is formed with a polysilicon film.

That is, in IC chip 100, field oxide film 102 is formed on a semiconductor substrate (for example, silicon substrate) on which shift register 110 is formed, and termination resistance 130 made of polysilicon film is formed on field oxide film 102. Termination resistance 130 is covered with interlayer insulating film 131, on which metal wire 132 is formed. Both ends of termination resistance 130 are electrically connected to upper metal wire 132 via contact openings 131a and 131b opened to interlayer insulating film 131. Metal wire 132 is covered with passivation film 133 serving as a protective film.

Assuming that the width of the polysilicon film forming terminal resistance 130 is W, the distance between contact openings 131a and 131b located at each end of the polysilicon film is L, the sheet resistance of the polysilicon film is Rs [Ω/□], and the resistance value of terminal resistance 130 which is the resistance between contact openings 131a and 131b is RL, the resistance value RL is given by the following formula:

$$RL=(L/W)\times Rs$$

As apparent from the above formula, termination resistance 130 formed by a polysilicon film can be set to have a desired resistance value RL by appropriately setting width W of the polysilicon film and distance L between contact openings 131a and 131b.

Termination resistance 130 shown in FIG. 12C is disposed in IC chip 100 shown in FIG. 4 on which shift register 110 shown in FIG. 1 is formed, and is formed by a diffusion resistance region including a diffusion resistor material formed by diffusing an impurity instead of the polysilicon film mentioned above.

That is, in IC chip 100, termination resistance 130 including the diffusion resistance region is formed in silicon substrate 101 on which shift register 110 is formed. If silicon substrate 101 is a P-type silicon substrate containing a P-type impurity, the diffusion resistance region is formed by diffusing an N-type impurity in the P-type silicon substrate. If silicon substrate 101 is an N-type silicon substrate containing an N-type impurity, the diffusion resistance region is formed by diffusing a P-type impurity in the N-type silicon substrate. Alternatively, the diffusion resistance region may be formed by diffusing an N-type impurity in a P-type well portion formed in the N-type silicon substrate, or by diffusing a P-type impurity in an N-type well portion formed in the P-type silicon substrate.

Silicon substrate 101, on which terminal resistance 130 including the diffusion resistance region is formed, is covered with interlayer insulating film 131, on which metal wire 132 is formed. Both ends of termination resistance 130 are electrically connected to upper layer metal wiring 132 via contact openings 131a and 131b opened on interlayer insulting film 131. Metal wire 132 is covered with passivation film 133.

Assuming that the width of the diffusion resistance region forming terminal resistance 130 is W, the distance between contact openings 131a and 131b located at both ends of the diffusion resistance region is L, the sheet resistance of the diffusion resistance region is Rs [Ω/□], and the resistance value of terminal resistance 130 which is the resistance between contact openings 131a and 131b is RL, the resistance value RL is given by the following formula:

$$RL=(L/W)\times Rs$$

As apparent from the above formula, termination resistance 130 formed by the diffusion resistance region can be set to the desired resistance value RL by appropriately setting width W of the diffusion resistance region and distance L between contact openings 131a and 131b.

(Operations of Printing Controller and Print Head According to Embodiment 2)

Figure 13A:
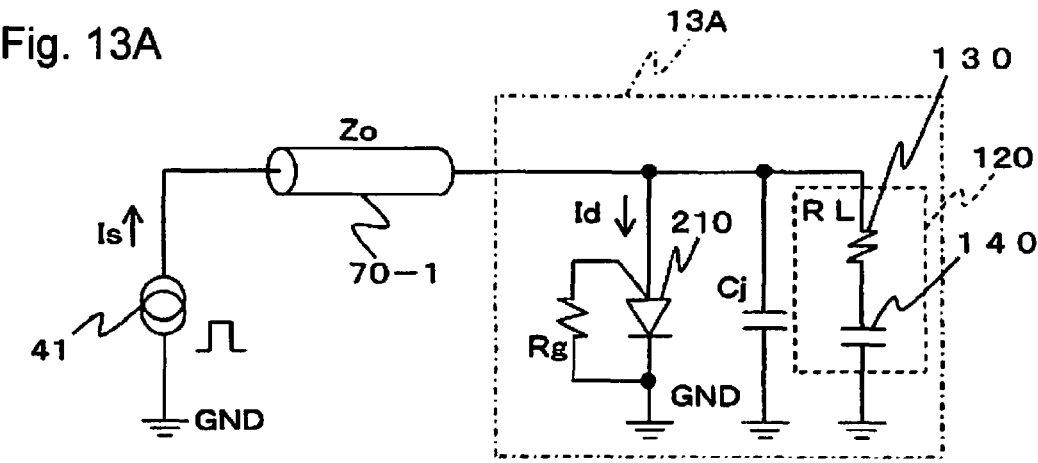
FIGS. 13A to 13D are diagrams illustrating operations of printing controller 40 and print head 13A shown in FIG. 11.
Figure 13B:
Figure 13C:
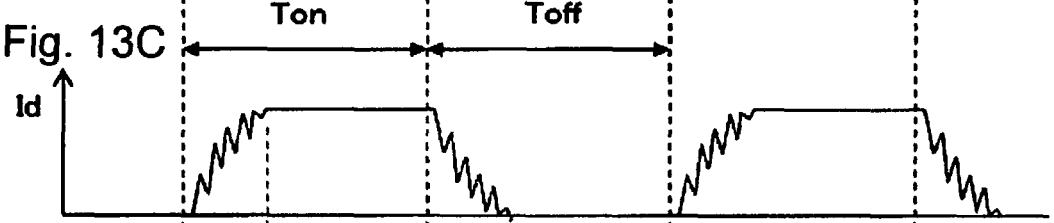
Figure 13D:
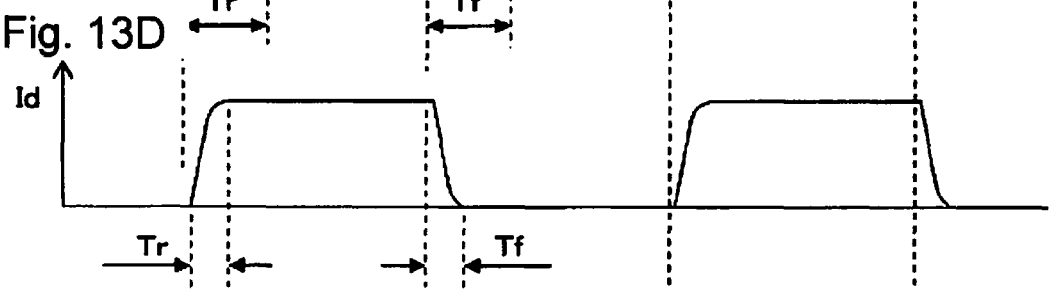

FIG. 13A to FIG. 13D are diagrams illustrating operations of printing controller 40 and print head 13A in FIG. 11. FIG. 13A is a diagram illustrating a modeled equivalent circuit including drive circuit 41, one light emitting thyristor 210 and terminating circuit 120 in FIG. 11. FIG. 13B to FIG. 13D are current waveform diagrams illustrating operations thereof.

In FIG. 13A, drive circuit 41 in FIG. 11 is shown with a symbol of a drive signal source of constant current generating drive current Is. Drive circuit 41 is connected to print head 13A via connection cable 70-1. Connection cable 70-1 is shown as a transmission path having characteristic impedance Zo and signal transmission delay time Td.

On the side of print head 13A, resistance Rg is connected between the gate and the cathode of light emitting thyristor 210 to turn light emitting thyristor 210 on, such that part of current components out of anode current Id flowing in from the anode of light emitting thyristor 210 flows as gate current to ground GND via resistance Rg and turns light emitting thyristor 210 on. Junction capacitance Cj is generated between the anode and the cathode of light emitting thyristor 210.

Terminating circuit 120 includes a series circuit of termination resistance 130 having the resistance value RL and capacitor 140. Capacitor 140 is provided to cut current components flowing via termination resistance 130 and capacitor 140 out of drive current Iout generated by drive circuit 41 which is a drive signal source so as to prevent drop of anode current ID flowing into light emitting thyristor 210.

FIG. 13B shows a waveform of drive current Is generated by drive circuit 41 which is a drive signal source, in which ON time and OFF time of drive current Is are indicated by Ton and Toff respectively.

FIG. 13C shows a waveform of anode current ID of light emitting thyristor 210 when there is no termination resistance 130 having the resistance value RL (that is, RL=∞), as a comparative example according to Embodiment 1, in which rise time and fall time of anode current Id are indicated by Tr and Tf respectively.

In connection cable 70-1, assuming that the cable length is L and the signal propagation speed in the cable is Vo, signal transmission delay time Td of connection cable 70-1 is given by the following formula.

$$Vo=Co/\sqrt{\in r}$$

Where
Co: Light speed in vacuum, Co≈3×10⁸ [m/s]
∈r: Dielectric constant of insulating material used in connection cable 70-1

From the above formula, signal transmission delay time Td is obtained from the following formula.

$$Td=(L/Co)\times\sqrt{\in r}$$

Assuming that the dielectric constant ∈r of connection cable 70-1 is 4 and cable length L is 1 [m] as a typical example, Td is:

$$Td\approx 6.7\ [nS]$$

As shown in FIG. 13C, when drive current Is generated by drive circuit 41, which is a drive signal source, rises, drive current Is reaches light emitting thyristor 210, which is a driven element, after a delay time equal to signal transmission delay time Td mentioned above, and a waveform of anode current Id starts to rise in light emitting thyristor 210. At that time, a portion between the anode and the cathode of light emitting thyristor 210 operates equivalently in the same manner as capacitor Cj, in which signal reflection is caused by capacitor Cj and a reflection wave moving toward drive circuit 41 in connection cable 70-1 is generated. The reflection wave reflects by internal impedance of drive circuit 41 and moves again in connection cable 70-1 toward print head 13A.

In this way, multiple signal reflection is caused between drive circuit 41, which is a drive signal source, and light emitting thyristor 210, which is a load thereof, via connection cable 70-1. Then, with a ripple generated at the cycle of 2×Td, current waveform of anode current Id rising at rise time Tr can be obtained.

As apparent by comparison between FIGS. 13B and 13C, even when the waveform of drive current Is generated by drive circuit 41 rises steeply, rise time Tr of the waveform of anode current Id in light emitting thyristor 210 becomes large.

When the multiple reflection waveform mentioned above decreases reflection volume each time the waveform reciprocates in connection cable 70-1, and for example, reflection components are annihilated after 10 times of the repeated reflection, rise time Tr of anode current Id mentioned above becomes Tr=2×Td×10≈6.7×20=134 [nS]. This also applies to fall time Tf when the waveform of anode current ID in light emitting thyristor 210 falls.

Compared with a rise time of drive current Is generated by drive circuit 41, rise time Tr of anode current mentioned above is a large value, which mainly depends on signal propagation delay time Td caused by connection cable 70-1, that is, cable length L. Therefore, to improve the light switching rate of print head 13, cable length L of connection cable 70-1 has to be made shorter.

However, it is difficult to shorten cable length L of connection cable 70-1 due to limitations resulting from status of component arrangements in image forming apparatus 1. In particular, in a tandem-type electrographic printer including sequentially disposed process units 10-1 to 10-4 identified with black (K), yellow (Y), magenta (M) and cyan (C) as shown in FIG. 2, cable length L of respective colored cables are different from each other, with the longest cable having a length longer than 1 meter. Consequently, rise time Tr and fall time Tf of the waveform of anode current Id in light emitting thyristor 210 increase, and thereby cause a problem that the switching rate of print head 13A using anode current Id cannot be improved.

In Embodiment 2, in order to solve this problem, terminating circuit 120 including termination resistance 130 and capacitor 140 is connected to common terminal IN at an end portion of light emitting thyristor array 200.

FIG. 13D is a waveform diagram of anode current Id of light emitting thyristor 210 showing an example that resistance value RL is set such that RL=Zo (or, RL≈Zo) when the characteristic impedance of connection cable 70-1 is Zo and the resistance value of termination resistance 130 is RL.

FIG. 13D shows that phenomena such as ripple waveform and increase of the shift time during signal shift shown in FIG. 13C are solved and switching of print head 13 is available with relatively shorter rise time Tr and fall time Tf of anode current Id.

Although the example shown in FIG. 13D is set to RL=Zo (or, RL≈Zo) when the resistance value of termination resistance 130 is RL, similar effect can be obtained by setting Zo/2≤RL≤2×Zo if slight ripple waveform can be allowed during the shift of the drive current waveform of light emitting thyristor 130.

To satisfy conditions of the formula mentioned above, a circuit shown in FIG. 11 illustrating a configuration according to Embodiment 2 includes a series circuit including a plurality of termination resistances 130-1 to 130-3, . . . provided at an end edge of light emitting element array 200, and points-to-be-connected with the connection point between termination resistances as a tap.

In this configuration, even if there is any difference in characteristic impedance Zo due to the type of connection cable 70-1, the formula mentioned above can be satisfied by modifying, for example, the shape of the thin film wire to connect common terminal IN on the side of light emitting thyristor 210 and the connection tap of termination resistance 130 so as to change the substantial resistance value of termination resistance 130. Therefore, the problem with connection cable 70-1 having a variety of characteristic impedances Zo can be solved by preparing just one kind of IC chip 100 on which shift register 110 and termination circuit 120 are formed.

In FIG. 11, a plurality of termination resistances 130-1 to 130-3, . . . connected in series are illustrated as connected in series in advance at a stage of fabricating IC chip 100 on which silicon register 110 and terminating circuit 120 are formed. However, the plurality of termination resistances 130-1 to 130-3, . . . may be connected with each other at a step in which terminals of light emitting thyristors 210-1 to 210-n and respective shift registers 110 are connected with each other by thin film wiring.

On the other hand, although FIG. 12 shows termination resistance 130 configured as a polysilicon film or diffusion resistance region provided on IC chip 100, termination resistance 130 may be formed alternatively with a material by patterning a same material as light emitting thyristor 210. For example, termination resistance 130 may be formed by patterning a predetermined portion of a compound semiconductor thin film made of AlGaAs or the like by the photolithography method, in which the compound semiconductor thin film applied on IC chip 100 in advance using a known epifilm bonding technique.

(Effects According to Embodiment 2)

According to Embodiment 2, there are similar effects as Embodiment 1, as well as effects (4) and (5) described below.

(4) In Embodiment 2 in which terminating circuit 120 is provided at an end portion of light emitting element 200, for example, when drive circuit 41 and print head 13A are configured as separate substrate units and connected with each other using connection cable 70-1, the problem of increased rise and fall times of the drive current waveform due to occurrence of multiple signal reflections between drive circuit 41 and light emitting thyristor 210 can be solved even when connection cable 70-1 used for the connection is long, whereby switching control of light emitting element array 200 can be made at high speed.

(5) In the configuration according to Embodiment 2 in which light emitting element array 200 is applied on IC chip 100 on which shift register 110 is formed, and terminating circuit 120 is also provided in IC chip 100, monolithic integration is available with no need to provide terminating circuit 120 separately, whereby further size reduction and cost saving can be achieved.

Embodiment 3

(Printing Controller and Print Head According to Embodiment 3)

Figure 14:
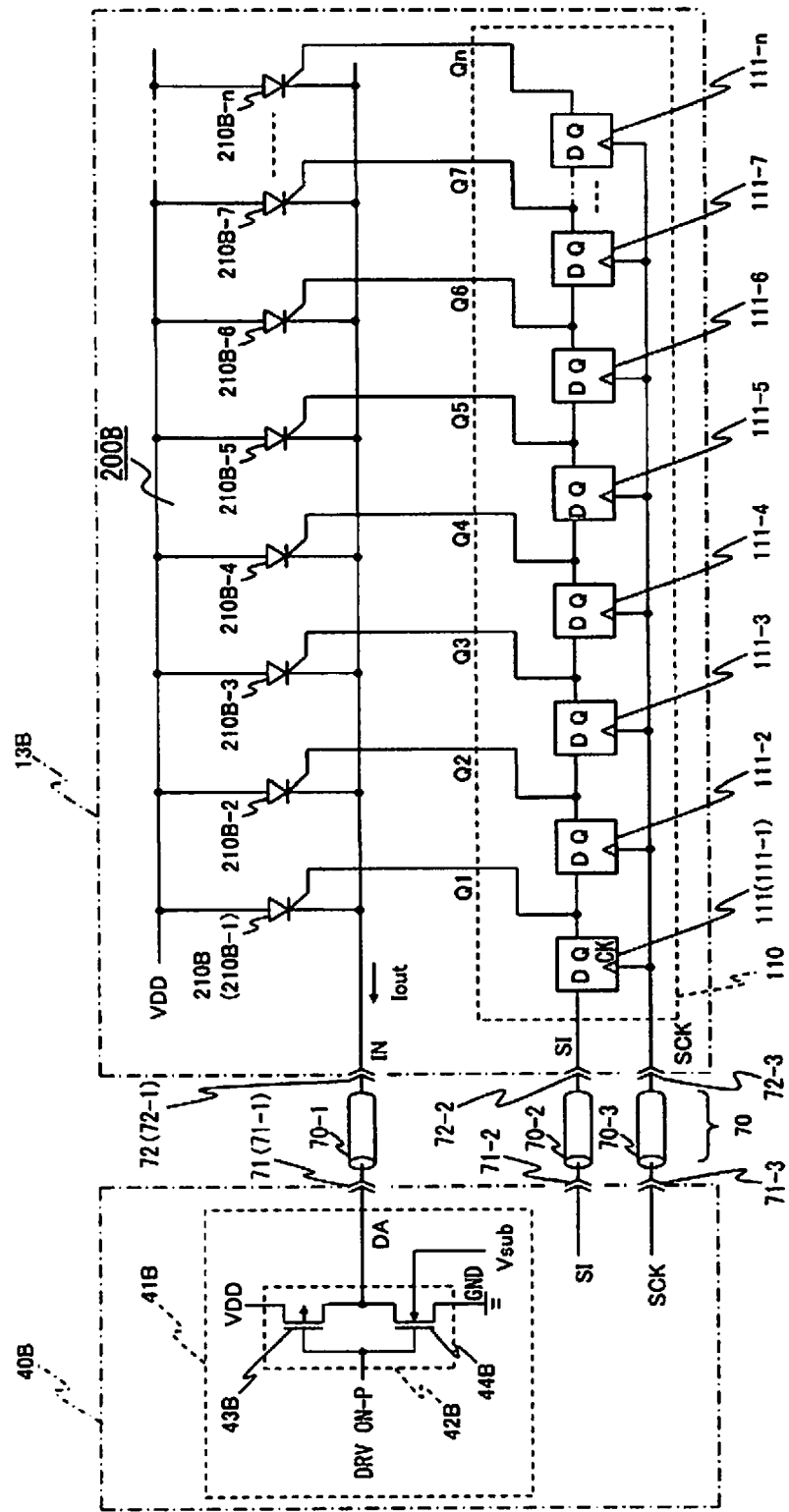
FIG. 14 is a block diagram illustrating a circuit configuration of a printing controller and a print head according to Embodiment 3 of the invention.

FIG. 14 is a block diagram illustrating a schematic circuit configuration of a printing controller and a print head in Embodiment 3 of the invention, in which common signs are assigned to elements common to those in FIG. 1 showing Embodiment 1.

In image forming apparatus 1 according to Embodiment 3, a circuit configuration of print head 13B and printing controller 40B is different from print head 13 and printing controller 40 according to Embodiment 1.

Print head 13 according to Embodiment 3 includes shift register 110 similar with Embodiment 1 and light emitting element array 200B of a configuration different from light emitting element array 200 according to Embodiment 1.

Light emitting element array 200B includes three-terminal light emitting elements which are, for example, a plurality of P-gate type light emitting thyristors 210B (210B-1 to 210B-n, . . . ), in which a first terminal (for example, anode) of respective light emitting thyristors 210B is connected to a first power supply (for example, power supply of supply voltage VDD), a second terminal (for example, cathode) thereof is connected to common terminal IN flowing drive current Tout, and a first control terminal (for example, gate) thereof is connected to output terminals Q1 to Qn, . . . of shift register 110. Light emitting thyristors 210B are elements which emit light, with supply voltage VDD applied between the anode and cathode, when cathode current flows with the anode-to-cathode turned on by input of "H" level trigger signal into the gate.

Printing controller 40B includes ON/OFF command signal DRVON-P (but, [–P] represents positive logic) which instructs ON/OFF of light emitting element array 200B, a circuit (not shown) which supplies serial data SI and serial clock SCK (control signals with respect to shift register 110) to print head 13B, and a plurality of drive circuit 41 which drives a plurality of light emitting element arrays 200B in a time division manner, and the like. Similarly with Embodiment 1, FIG. 14 shows only one drive circuit 41B in order to simplify explanation. The plurality of light emitting element arrays 200B includes, for example, 4992 light emitting thyristors 210B-1 to 210B-n, . . . in total, which are grouped to a plurality of groups each including light emitting thyristors 210B-1 to 210B-n and which are driven by drive circuit 41 provided per group in parallel in a divided manner.

Further, drive circuit 41B disposed inside printing controller 40B in FIG. 14 may be disposed inside print head 13B.

Drive circuit 41B includes CMOS inverter 42B which inverts and outputs ON/OFF command signal DVRON-P to data terminal DA. CMOS inverter 42 includes second MOS transistor (for example, PMOS) 43B of a second conductive type and first MOS transistor (for example, NMOS) 44B of a first conductive type, which are connected in series with each other between a first power supply (for example, power supply of supply voltage VDD) and a second power supply (for example, ground GND of ground potential).

That is, PMOS 43B includes a gate to which ON/OFF command signal DVRON-P is input, a source which is connected to VDD power supply, and a drain which is connected to data terminal DA. NMOS 44B includes a second control terminal (for example, gate) to which ON/OFF command signal DRVON-P is input, a third terminal (for example, source) which is connected to ground GND (=0V), a fourth terminal (for example, drain) which is connected to data terminal DA, and a substrate terminal which is set to have a potential (for example, low substrate potential Vsub) different from the ground potential. In the NMOS 44B, a potential difference is set between source and substrate terminals to increase threshold voltage Vtn.

Similarly with Embodiment 1, data terminal DA is connected to common terminal IN on the side of light emitting element array 200B via connection connector 71-1, connection cable 70-1 and connection connector 72-1.

A drive device according to Embodiment 3 includes drive circuit 41B and the like on the side of printing controller 40B, and shift register 110 on the side of print head 13B.

(Operations of Printing Controller and Print Head According to Embodiment 3)

In FIG. 14, for example, when ON/OFF command signal DRVON-P in printing controller 40B is at "L" level, PMOS 43B constituting CMOS inverter 42B is turned on, NMOS 44B is turned off, and data terminal DA on the output side is at "H" level (≈supply voltage VDD). Consequently, voltage of common terminal IN on the side of print head 13B becomes substantially supply voltage VDD, anode-to-cathode voltage of respective light emitting thyristors 210B becomes substantially zero, drive current Iout flowing thereto becomes zero, and all of light emitting thyristors 210B to 210B-n are in the state in which no light is emitted.

On the contrary, when ON/OFF command signal DRVON-P is at "H" level, PMOS 43B constituting CMOS inverter 42B is turned off, NMOS 44B is turned ON, and data terminal DA on the output side is at "L" level. Consequently, common terminal IN on the side of print head 13B also turns at "L" level, and substantial supply voltage VDD is applied between the anode and the cathode of respective light emitting thyristors 210B. At that time, only light emitting thyristors 210B instructed to emit light are turned on by selectively turning only gates of light emitting thyristors 210B thus instructed out of light emitting thyristors 210B-1 to 210B-n. Current flowing into a cathode of turned-on light emitting thyristor 210B is a current flowing into data terminal DA via common terminal IN (that is, drive current Tout), turning light emitting thyristor 210B to a light emitting state, and thereby generates light output corresponding to drive current Iout.

Here, in drive circuit 41B, a source of NMOS 44B is connected to ground GND, and a substrate terminal is set to have substrate potential Vsub. Considering a specific design example, for example, supply voltage VDD could be set to 3.3V, ground potential of ground GND to 0V, and substrate potential Vsub to −2V. In this case, a potential difference (=2V) is set between source and substrate terminals of NMOS 44B, causing substrate bias effects in NMOS 44B which increase threshold voltage Vtn depending on the potential difference. When NMOS 44B is turned on, supply voltage VDD is applied between the gate and the source, the voltage being 3.3V at most but enough to operate NMOS 44B in the saturation region.

As well known from a theory of electronic device physics, drain current Id of NMOS 44B at that time is given by the following formula.

$$Id = K \times (W/L) \times (Vgs - Vtn)^2$$

Where;
W: Gate width of NMOS 44B
L: Gate length of NMOS 44B
Vtn: Threshold voltage of NPMOS 44B
Vgs: Gate-to-source voltage of NMOS 44B (≈supply voltage VDD)

Threshold voltage Vtn of NMOS 44 varies depending on substrate potential Vsub which is set by the substrate terminal. Consequently, as apparent from the formula given above, drain current Id of NMOS 44B, that is, drive current Iout of light emitting thyristor 210B, can be varied by adjusting supply voltage VDD and substrate potential Vsub.

Although drive circuit 41B shown in FIG. 14 is provided with PMOS 43B to turn data terminal DA to "H" level, light emitting thyristors 210B-1 to 210B-n can be turned on by shutting off drive current Iout with NMOS 44B turned off. Therefore, PMOS 43B may be omitted in a case where high speed switching of light emitting thyristor 210B is not required.

(Advantageous Effects According to Embodiment 3)

According to Embodiment 3, there are almost the same effects as those according to Embodiment 1. Further, almost same effects as those according to Embodiment 2 can be obtained by providing terminating circuit 120 shown in FIG. 11 according to Embodiment 2 on the side of print head 13B.

Modified Example

The invention is not limited to embodiments 1 to 3 described above but may be modified for a variety of utilizations such as, for example, (I) and (II) described below.

(I) Although the cases where the invention is applied to light emitting thyristors 210 and 210B as a light source are described in Embodiments 1 to 3, the invention may be applied to a case where thyristors are used as switching elements and voltage applied to another element (for example, organic electroluminescent element (hereinafter referred to as "organic EL element"), display element, and the like) which is, for example, connected in series with the switching elements. For example, the invention may be utilized for a printer provided with an organic EL print head including organic EL element arrays, a display device including display element arrays, and the like.

(II) The invention also may be applied to a thyristor used as a switching element to drive (that is, to control voltage application of) a display element (for example, display element arrayed in rows or matrix). Further, the invention also may be applied not only to a thyristor including a three-terminal structure but also to a four-terminal thyristor SCS (Silicon Semiconductor Controlled Switch) including two gates, that is, first and second gates.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A drive device configured to drive a plurality of three-terminal light emitting elements with each light emitting element comprising: a first terminal connected to a first power supply; a second terminal configured to enable drive current flow to the first terminal from the second terminal, and a first control terminal configured to control the conduction state between the first terminal and the second terminal, the first terminals of the plurality of three-terminal light emitting elements being connected in common, the second terminals of the plurality of three-terminal light emitting elements being connected in common, the drive device comprising:
a drive circuit, including a first MOS transistor, and configured to drive three-terminal light emitting elements that are in conduction state among the plurality of three-terminal light emitting elements based on a received drive signal, wherein
the first MOS transistor includes:
a third terminal connected to a second power supply having a potential different from the potential of the first power supply;
a fourth terminal connected to the second terminals of the plurality of three-terminal light emitting elements connected in common, a second control terminal configured to control the conduction state between the third terminal and the fourth terminal based on the drive signal; and
a substrate terminal configured to have a potential applied thereto different from the potential of the second power supply to change a threshold voltage of the first MOS transistor, wherein
an absolute value of the potential that is applied to the substrate terminal is set higher than an absolute value of the potential of the second power supply such that an equivalent output resistance value of the drive circuit is higher than a maximum value of an absolute value of negative resistance determined by a turn-on characteristic of the three-terminal light emitting elements, wherein a threshold voltage of the first MOS transistor is increased in such a manner that the first MOS transistor exhibits a constant current property.

2. The drive device according to claim 1, wherein the drive circuit further includes a second MOS transistor connected between the second terminals of the plurality of three-terminal light emitting elements connected in common and the first power supply and configured to perform on/off operations complementary to the first MOS transistor based on the drive signal.

3. The drive device according to claim 2, wherein
the potential of the first power supply is a ground potential,
the potential of the second power supply is a positive power supply potential,
the potential set in the substrate terminal is a positive potential higher than the potential of the second power supply,
the drive signal is a signal shifting between a logic "H" level and a logic "L" level,
the first MOS transistor is a P-channel MOS transistor including a source which is the third terminal, a drain which is the fourth terminal, a gate which is the second control terminal, and the substrate terminal, and configured to be conducting when the drive signal is at the logic "L" level, and
the second MOS transistor is an N-channel MOS transistor.

4. The drive device according to claim 2, wherein
the potential of the first power supply is a positive power supply potential,
the potential of the second power supply is a ground potential,
the potential set in the substrate terminal is a negative potential less than the potential of the second power supply,
the drive signal is a signal shifting between a logic "H" level and a logic "L" level,
the first MOS transistor is an N-channel MOS transistor including a source which is the third terminal, a drain which is the fourth terminal, a gate which is the second control terminal, and the substrate terminal, and configured to be conducting when the drive signal is at the logic "H" level, and
the second MOS transistor is a P-channel MOS transistor.

5. The drive device according to claim 1, wherein the fourth terminal and the second terminals connected in common are connected with each other via a connection cable having a predetermined characteristic impedance, and
a terminating circuit having a termination resistor connected to the second terminals connected in common is disposed at an end portion of an area where the plurality of three-terminal light emitting elements are arrayed.

6. The drive device according to claim 5, wherein
the terminating circuit includes the termination resistor and a capacitor, and
the termination resistor and the capacitor are connected in series between the second terminals connected in common and a ground potential terminal.

7. The drive device according to claim 5, wherein the termination resistor has a resistance value substantially equal to the characteristic impedance in the connection cable.

8. The drive device according to claim 5, wherein the terminating circuit is set to satisfy a relationship of $Zo/2 \leq RL \leq 2 \times Zo$ where a resistance value of the termination resistor is RL and the characteristic impedance in the connection cable is Zo.

9. The drive device according to claim 5, further comprising a shift register configured to receive serial data and to sequentially output a plurality of trigger signals on the basis of clock signals, and to turn the three-terminal light emitting elements on by giving the plurality of trigger signals to the first control terminals in the three-terminal light emitting elements,
wherein the termination resistor is formed on a semiconductor chip in which the shift register is integrated.

10. The drive device according to claim 5, wherein
the connection cable is any one of a coaxial cable, an insulated wire, a twist pair cable, a flexible flat cable, or a flexible printed board.

11. The drive device according to claim 5, wherein resistor is made of any one of a polysilicon material formed on a semiconductor substrate, a diffusion resistance material formed by diffusing an impurity or a material formed by pattering the same material as a material for the three-terminal light emitting elements.

12. The drive device according to claim 1, wherein
each of the three-terminal light emitting elements is a light emitting thyristor, and
the light emitting thyristor includes the first terminal as a cathode, the second terminal as an anode, and the first control terminal as a gate.

13. The drive device according to claim 1, further comprising a shift register configured to receive serial data and to sequentially output a plurality of trigger signals on the basis of clock signals, and to turn the three-terminal light emitting elements on by giving the plurality of trigger signals to the first control terminals in the three-terminal light emitting elements.

14. A print head comprising:
the plurality of three-terminal light emitting elements and the drive device according to claim 1.

15. An image forming apparatus comprising
the print head according to claim 14, wherein
the print head emits light to form an image on a recording medium.

16. An image forming apparatus comprising
the print head according to claim 14 to emit light;
an image carrier configured to have a latent image formed thereon by receiving the light emitted from the print head;
a development unit configured to form a developer image on the image carrier by developing the latent image on the image carrier with a developer;
a transfer unit configured to transfer the developer image onto a recording medium; and
a fixing unit configured to fix the developer image to the recording medium.

17. The drive device according to claim 1, a further comprising current adjusting means for adjusting a current flowing through the fourth terminal of the first MOS transistor by adjusting the potential applied to the substrate terminal.

18. The drive device according to claim 1, wherein the fourth terminal of the first MOS transistor is directly connected with the second terminal of each of the three-terminal light emitting elements.

* * * * *